US012704582B2

(12) United States Patent
Duan et al.

(10) Patent No.: US 12,704,582 B2
(45) Date of Patent: Aug. 11, 2026

(54) SIDELINK-AIDED HYBRID NETWORK POSITIONING

(71) Applicant: QUALCOMM Incorporated, San Diego, CA (US)

(72) Inventors: Weimin Duan, San Diego, CA (US); Alexandros Manolakos, Escondido, CA (US); Jing Lei, San Diego, CA (US); Hung Dinh Ly, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/030,361

(22) PCT Filed: Dec. 17, 2021

(86) PCT No.: PCT/US2021/072987
§ 371 (c)(1),
(2) Date: Apr. 5, 2023

(87) PCT Pub. No.: WO2022/140745
PCT Pub. Date: Jun. 30, 2022

(65) Prior Publication Data

US 2023/0333194 A1 Oct. 19, 2023

(30) Foreign Application Priority Data

Dec. 23, 2020 (GR) .............................. 20200100746

(51) Int. Cl.

| | |
|---|---|
| ***G01S 5/00*** | (2006.01) |
| ***G01S 5/02*** | (2010.01) |
| ***H04W 92/18*** | (2009.01) |

(52) U.S. Cl.
CPC .......... *G01S 5/0072* (2013.01); *G01S 5/0236* (2013.01); *G01S 5/0268* (2013.01); *G01S 2205/008* (2013.01); *H04W 92/18* (2013.01)

(58) Field of Classification Search
None
See application file for complete search history.

(56) References Cited

U.S. PATENT DOCUMENTS 4,670,757 A 6/1987 Munich et al.
8,750,808 B2 6/2014 Kazmi et al.
(Continued)

FOREIGN PATENT DOCUMENTS

CN 1694567 A 11/2005
CN 106662634 A 5/2017
(Continued)

OTHER PUBLICATIONS

Huawei., et al., “On the Impact of DRX on CLI SRS-RSRP Measurement,” 3GPP Draft, 3GPP TSG-RAN2 Meeting #110 electronic, R2-2005309, 3rd Generation Partnership Project (3GPP), Mobile Competence Centre, 650, Route Des Lucioles, F-06921, Sophia-Antipolis Cedex, France, vol. RAN WG2, No. electronic; Jun. 1, 2020-Jun. 12, 2020, May 21, 2020 (May 21, 2020), XP051887589, 28 pages, section 2.1 section 2.2, Alternative 1, The whole document.
(Continued)

*Primary Examiner* — Whitney Moore
(74) *Attorney, Agent, or Firm* — Weaver Austin Villeneuve & Sampson LLP

(57) ABSTRACT

Techniques for a high-accuracy determination the position of a light user equipment (UE) using a single base station are presented. This is accomplished by leveraging communications with a premium UE having a known location relative to the base station. Wireless reference signals measured by
(Continued)

the light UE and premium UE, along with a reference signal from the light UE to the premium UE, can be used to determine the position of the light UE geometrically. The determination can be made by the light UE, premium UE, or a location server, depending on desired functionality.

35 Claims, 13 Drawing Sheets

(56) References Cited

U.S. PATENT DOCUMENTS

| | | | |
|---|---|---|---|
| 9,351,112 B2 | 5/2016 | Smith et al. | |
| 9,648,651 B2 | 5/2017 | Edge | |
| 9,713,117 B2 | 7/2017 | Khoryaev et al. | |
| 9,866,993 B2 | 1/2018 | Das et al. | |
| 10,616,858 B2 | 4/2020 | Agnihotri et al. | |
| 10,736,074 B2 | 8/2020 | Edge et al. | |
| 10,972,958 B1 | 4/2021 | Wang et al. | |
| 11,570,577 B2 | 1/2023 | Wong et al. | |
| 2003/0001777 A1 | 1/2003 | Johnson | |
| 2003/0114169 A1 | 6/2003 | Okamura et al. | |
| 2005/0078626 A1 | 4/2005 | Ogino et al. | |
| 2005/0288037 A1 | 12/2005 | Marinier | |
| 2010/0177681 A1 | 7/2010 | Sahinoglu | |
| 2011/0039574 A1 | 2/2011 | Charbit et al. | |
| 2013/0203447 A1 | 8/2013 | Hannan et al. | |
| 2014/0295881 A1 | 10/2014 | Werner et al. | |
| 2014/0365488 A1 | 12/2014 | Arslan et al. | |
| 2016/0095080 A1 | 3/2016 | Khoryaev et al. | |
| 2016/0183044 A1 | 6/2016 | Wei et al. | |
| 2016/0337805 A1 | 11/2016 | Liao et al. | |
| 2017/0108579 A1 | 4/2017 | Irvine et al. | |
| 2017/0367067 A1 | 12/2017 | Hwang et al. | |
| 2019/0037350 A1 | 1/2019 | Prevatt | |
| 2019/0230618 A1 | 7/2019 | Saur et al. | |
| 2019/0297673 A1 | 9/2019 | Xue et al. | |
| 2019/0364536 A1 | 11/2019 | Sadiq et al. | |
| 2020/0072939 A1 | 3/2020 | Yamada et al. | |
| 2020/0137714 A1 | 4/2020 | Kumar et al. | |
| 2020/0145977 A1 | 5/2020 | Kumar et al. | |
| 2020/0196298 A1 | 6/2020 | Edge et al. | |
| 2020/0229126 A1 | 7/2020 | Soriaga et al. | |
| 2020/0250352 A1 | 8/2020 | Wodrich et al. | |
| 2020/0267041 A1* | 8/2020 | Kim | H04L 5/00 |
| 2020/0333427 A1 | 10/2020 | Hu et al. | |
| 2020/0359329 A1 | 11/2020 | Manolakos et al. | |
| 2021/0022105 A1 | 1/2021 | Yu et al. | |
| 2021/0105867 A1 | 4/2021 | Akkarakaran et al. | |
| 2022/0065979 A1* | 3/2022 | Bao | G01S 5/0246 |
| 2022/0187411 A1* | 6/2022 | Manolakos | H04L 5/0051 |
| 2022/0229146 A1 | 7/2022 | Ko et al. | |
| 2022/0236365 A1 | 7/2022 | Ko et al. | |
| 2022/0295442 A1 | 9/2022 | Goyal et al. | |
| 2022/0326335 A1 | 10/2022 | Ko et al. | |
| 2023/0017758 A1 | 1/2023 | Shpak | |
| 2023/0319766 A1* | 10/2023 | Manolakos | H04L 5/0051 455/456.1 |
| 2023/0384443 A1 | 11/2023 | Duan et al. | |
| 2023/0422201 A1 | 12/2023 | Shimoda et al. | |
| 2024/0022375 A1* | 1/2024 | Keating | H04W 92/18 |
| 2024/0085517 A1 | 3/2024 | Duan et al. | |
| 2024/0114480 A1 | 4/2024 | Duan et al. | |

FOREIGN PATENT DOCUMENTS

| | | | |
|---|---|---|---|
| CN | 106705961 | A | 5/2017 |
| CN | 107439044 | A | 12/2017 |
| CN | 108141776 | A | 6/2018 |
| CN | 109792618 | A | 5/2019 |
| CN | 110036307 | A | 7/2019 |
| CN | 110383862 | A | 10/2019 |
| CN | 111405508 | A | 7/2020 |
| CN | 111566499 | A | 8/2020 |
| CN | 112188542 | A | 1/2021 |
| CN | 112567789 | A | 3/2021 |
| EP | 3543731 | A1 | 9/2019 |
| EP | 3251235 | B1 | 3/2021 |
| JP | H05100020 | A | 4/1993 |
| JP | 2004317157 | A | 11/2004 |
| JP | 2010160132 | A | 7/2010 |
| JP | 2010216814 | A | 9/2010 |
| JP | 2016042075 | A | 3/2016 |
| JP | 2016535515 | A | 11/2016 |
| JP | 2017527806 | A | 9/2017 |
| TW | 202103512 | A | 1/2021 |
| WO | 2013176999 | A1 | 11/2013 |
| WO | 2016137658 | A1 | 9/2016 |
| WO | WO-2018068817 | A1 | 4/2018 |
| WO | 2018160141 | A1 | 9/2018 |
| WO | 2019027595 | A1 | 2/2019 |
| WO | 2019078996 | A1 | 4/2019 |
| WO | 2019209746 | A1 | 10/2019 |
| WO | 2020057748 | A1 | 3/2020 |
| WO | 2020067848 | A1 | 4/2020 |
| WO | WO-2020102971 | A1 | 5/2020 |
| WO | 2020123817 | A1 | 6/2020 |
| WO | WO-2020163392 | A1 | 8/2020 |
| WO | 2020200171 | A1 | 10/2020 |
| WO | 2020256365 | A1 | 12/2020 |
| WO | WO-2021030583 | A1 | 2/2021 |
| WO | 2021057175 | A1 | 4/2021 |

OTHER PUBLICATIONS

International Search Report and Written Opinion—PCT/US2021/072987—ISA/EPO—May 11, 2022.

LGE: "CLI Configuration", 3GPP TSG-RAN WG2 Meeting #111 electronic, R2-2007989, Online, Aug. 17-28, 2020, Aug. 28, 2020(Aug. 28, 2020), pp. 1-25, The whole document.

Qualcomm Incorporated: "UE & gNB Measurements for NR Positioning", 3GPP TSG RAN WG1 #96bis, R1-1905034, Xi'an, China, Apr. 8, 2019-Apr. 12, 2019, Apr. 3, 2019, 9 Pages.

Taiwan Search Report—TW110147772—TIPO—Jul. 28, 2025.

* cited by examiner

SIDELINK-AIDED HYBRID NETWORK POSITIONING

RELATED APPLICATIONS

This application is a National Phase entry of International Application No. PCT/US2021/072987, filed Dec. 23, 2020, entitled "SIDELINK-AIDED HYBRID NETWORK POSITIONING" which claims the benefit of Greek application No. 20200100746, filed Dec. 23, 2020, entitled "SIDELINK-AIDED HYBRID NETWORK POSITIONING", both of which are assigned to the assignee hereof, and incorporated by reference herein in their entirety.

BACKGROUND

1. Field of Invention

The present invention relates generally to the field of wireless communications, and more specifically to determining the location (or position) of a User Equipment (UE) using radiofrequency (RF) signals.

2. Description of Related Art

In a data communication network, various positioning techniques can be used to determine the position of a mobile device (referred to herein as a user equipment or a UE). Some of these positioning techniques may involve determining distance and/or angular information of RF signals received by one or more base stations of the data communication network. These determinations, however, typically require the mobile device to communicate with multiple base stations. Communicating in this manner can often exceed the power budgets for some low-power mobile devices.

BRIEF SUMMARY

Embodiments described herein provide for a high-accuracy determination the position of a first user equipment (UE) using a single base station are presented. This is accomplished by leveraging communications with a second UE having a known location relative to the base station. Wireless reference signals measured by the first UE and second UE, along with a reference signal from the first UE to the second UE (e.g., using a sidelink communication channel), can be used to determine the position of the first UE geometrically. The determination can be made by the first UE, second UE, or a location server, depending on desired functionality.

An example method of determining a position of a first mobile device, according to this disclosure, comprises determining a first time difference, where the first time difference may comprise a time difference between: a time a first wireless reference signal transmitted by a network entity arrives at the first mobile device, and a time the first mobile device first transmits a second wireless reference signal. The method also comprises determining a second time difference, where the second time difference may comprise a time difference between: a time a third wireless reference signal transmitted by the network entity arrives at a second mobile device, and a time the second wireless reference signal arrives at the second mobile device. The method also comprises determining the position of the first mobile device based on the first time difference and the second time difference. The method also comprises providing the position of the first mobile device.

An example device, according to this disclosure, comprises a communication interface, a memory, and one or more processing units communicatively coupled with the communication interface and the memory. The one or more processing units are configured to determine a first time difference, where the first time difference may comprise a time difference between: a time a first wireless reference signal transmitted by a network entity arrives at a first mobile device, and a time the first mobile device transmits a second wireless reference signal. The one or more processing units are further configured to determine a second time difference, where the second time difference may comprise a time difference between: a time a third wireless reference signal transmitted by the network entity arrives at a second mobile device, and a time the second wireless reference signal arrives at the second mobile device. The one or more processing units are further configured to determine a position of the first mobile device based on the first time difference and the second time difference, and provide the position of the first mobile device.

Another example device, according to this disclosure, comprises means for determining a first time difference, where the first time difference may comprise a time difference between: a time a first wireless reference signal transmitted by a network entity arrives at a first mobile device, and a time the first mobile device transmits a second wireless reference signal. The device also comprises means for determining a second time difference, where the second time difference may comprise a time difference between: a time a third wireless reference signal transmitted by the network entity arrives at a second mobile device, and a time the second wireless reference signal arrives at the second mobile device. The device also comprises means for determining a position of the first mobile device based on the first time difference and the second time difference. The device also comprises means for providing the position of the first mobile device.

An example non-transitory computer-readable medium, according to this disclosure, stores instructions for determining a position of a first mobile device. The instructions comprise code for determining a first time difference, where the first time difference may comprise a time difference between: a time a first wireless reference signal transmitted by a network entity arrives at the first mobile device, and a time the first mobile device transmits a second wireless reference signal. The instructions also comprise code for determining a second time difference, where the second time difference may comprise a time difference between: a time a third wireless reference signal transmitted by the network entity arrives at a second mobile device, and a time the second wireless reference signal arrives at the second mobile device. The instructions also comprise code for determining the position of the first mobile device based on the first time difference and the second time difference. The instructions also comprise code for providing the position of the first mobile device.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
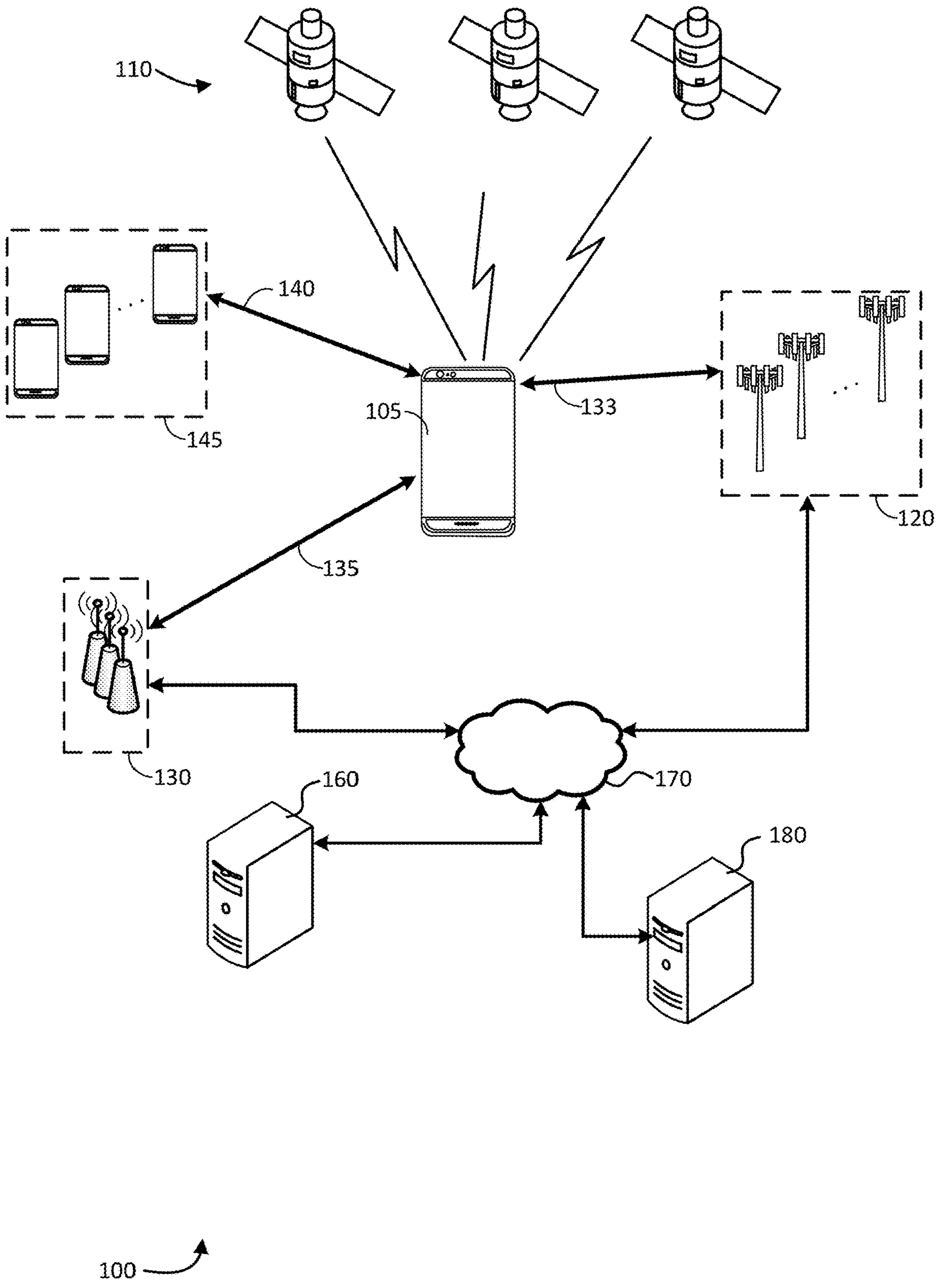
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" or "reference signal" comprises an electromagnetic wave that transports information through the space between a transmitter (or transmitting device) and a receiver (or receiving device). As used herein, a transmitter may transmit a single "reference signal" or multiple "reference signals" to a receiver. However, the receiver (or different receivers) may receive multiple "reference signals" corresponding to each transmitted RF signal due to the propagation characteristics of RF signals through multipath channels. The same transmitted RF signal on different paths between the transmitter and receiver may be referred to as a "multipath" RF signal.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

FIG. 1 is a simplified illustration of a positioning system 100 in which a UE 105, location server 160, and/or other components of the positioning system 100 can use the techniques provided herein for determining and estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

The location server 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
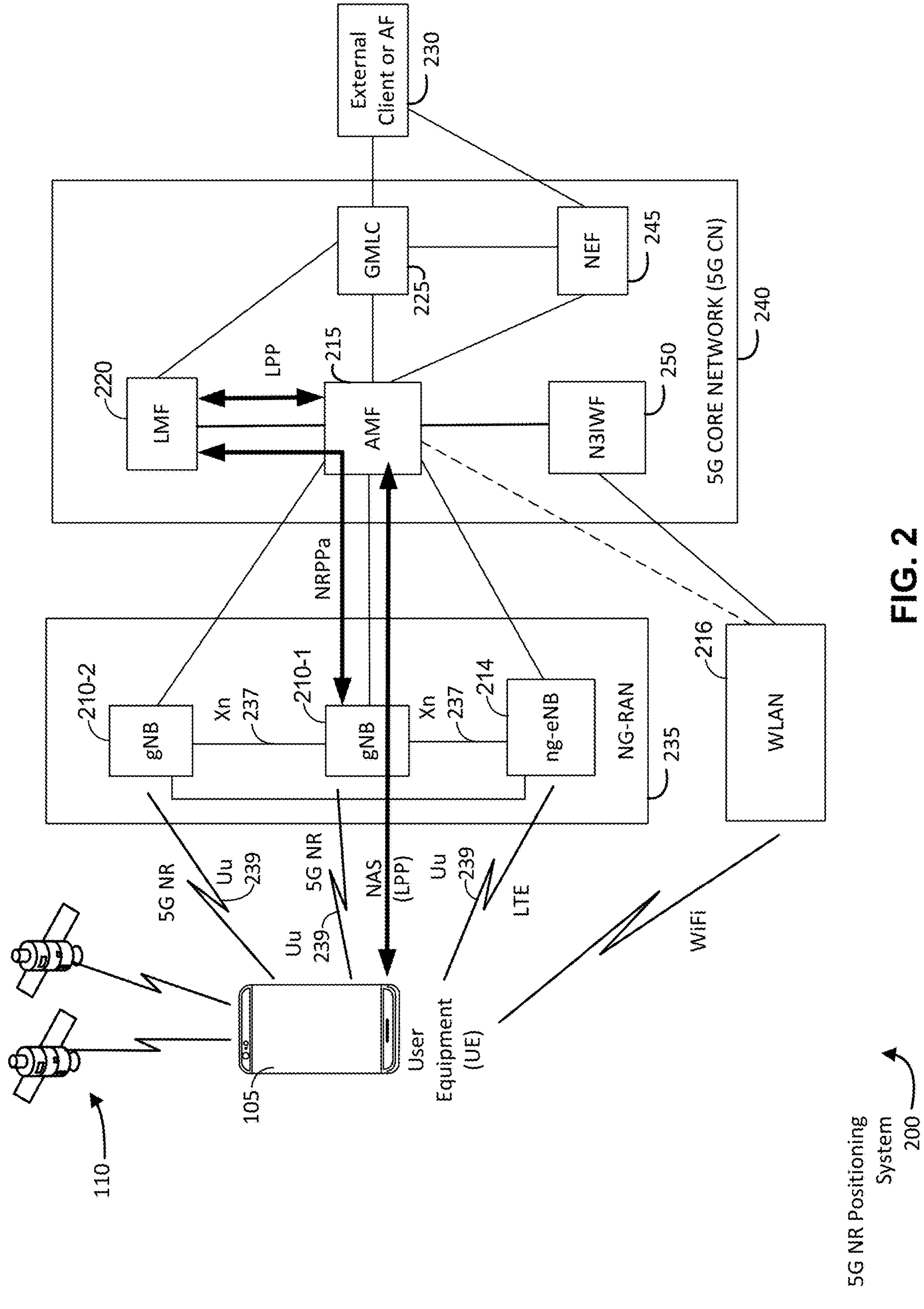
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMG 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx→Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
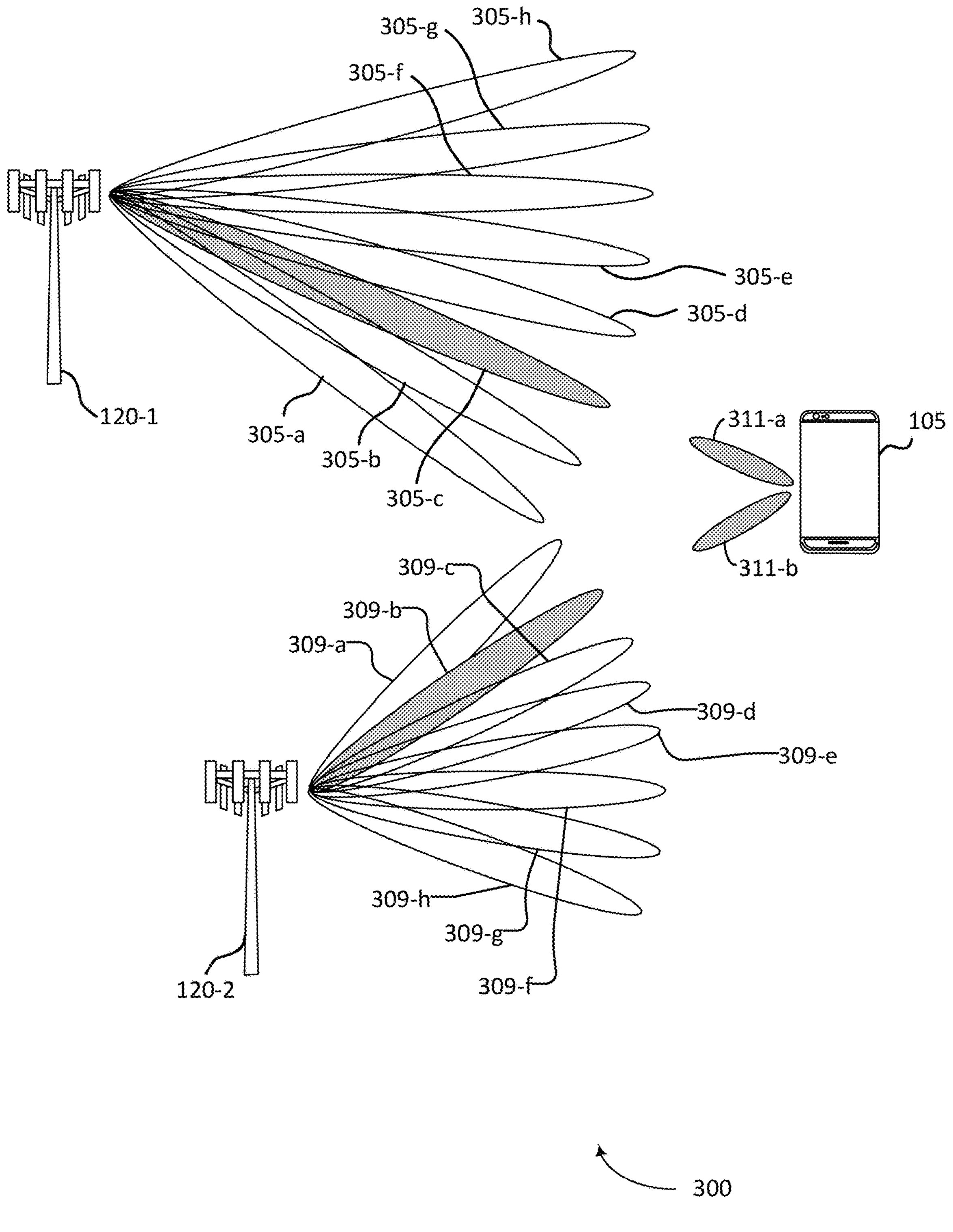
FIG. 3 is a diagram illustrating beamforming in a 5G NR positioning system.

FIG. 3 is a diagram illustrating a simplified environment 300 including two base stations 120-1 and 120-2 (which may correspond to base stations 120 of FIG. 1 and/or gNBs 210 and/or ng-eNB 214 of FIG. 2) producing directional beams for transmitting RF reference signals, and a UE 105. Each of the directional beams is rotated, e.g., through 120 or 360 degrees, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-*d*, 309-*e*, 309-*f*, 309-*g*, and 309-*h*. Because UE 105 may also include an antenna array, it can receive RF reference signals transmitted by base stations 120-1 and 120-2 using beamforming to form respective receive beams (Rx beams) 311-*a* and 311-*b*. Beamforming in this manner (by base stations 120 and optionally by UEs 105) can be used to make communications more efficient. They can also be used for other purposes, including taking AoD measurements.

AoD can be measured when a base station 120 uses beam sweeping to transmit reference signals in each of a plurality of directions, using a respective plurality of beams (e.g., beams 309-*a* through 309-*f*). By using RSRP measurements of each reference signal at the UE 105, the beam 309 the most aligned with the UE 105 can be identified (as one having the highest value). Additional techniques may be performed to determine an accurate AoD based on the alignment. For UE-based positioning, information regarding each beam 309 (e.g., beam width and boresight) may be provided to the UE 105 to allow the UE to calculate AoD. Alternatively, for UE-assisted positioning, the UE may provide RSRP measurements to a location server 160 (e.g., LMF 220), which can use the RSRP measurements and beam information to calculate the AoD.

Network-based positioning of a UE may often require the UE to communicate with a plurality of base stations. In RTT-based positioning, for example RTT measurements can involve transmitting and receiving wireless reference signals with multiple base stations, and further reporting Rx-Tx time difference measurements to a serving base station. With many types of UEs, such as mobile phones, the power requirements of RTT-based positioning may not be an issue. However, with "light" UEs, which typically have a much tighter power budget, these types of communications can be problematic.

As used herein, the term "light" or "low-tier" UE or device refers to a wireless device having a relatively low operating bandwidth, as compared with a "premium" UE or device, which has a relatively high operating bandwidth. Light UEs may also be called "reduced-capability" UEs. For reduced-capability devices in 5G NR, 3GPP is developing "NR Light" standards that allow for NR devices with reduced complexity and energy consumption to meet the higher latency and data rate acquirements in a 5G NR environment (as compared with narrowband IoT (NB-IoT) or LTE-M in and LTE environment). As such, references to light or low tier UEs or devices herein may refer to 5G NR devices using NR Light, and references to premium UEs or devices herein may refer to 5G NR devices using standard NR. Examples of light UEs can include wearable devices (e.g., smart watches), relaxed/narrowband IoT devices, low-end mobile phones, and the like. The current operating bandwidth of these devices is roughly 5-20 megahertz (MHz), although some low-tier UEs may have a higher or lower operating bandwidth. Examples of premium UEs may comprise high-end mobile phones (e.g., smart phones), tablets, vehicles, and the like. Premium UEs currently operate at a bandwidth of 100 MHz or more. Generally speaking, light UEs have a relatively lower bandwidth (e.g., less than 100 MHz), lower processing capabilities, and/or lower power budgets than premium UEs.

As noted, network-based positioning often requires communication with multiple base stations. For example, high-accuracy positioning determinations (e.g. with an accuracy of 3 m or less) often require multi-RTT, in which RTT measurements are made between a UE and multiple base stations. However, the power requirements of communicating with multiple base stations can often be burdensome to light UEs. Moreover, light UEs may be incapable of obtaining reference signals (e.g., PRS) from multiple base stations due to antenna loss, low bandwidth, fewer antennas, and reduced baseband capabilities, compared with premium UEs. Additionally, light UEs have a reduced transmit power, which can result in a lower quality uplink (UL) measurement at the base station of an RF signal transmitted by a light UE.

Figure 4:
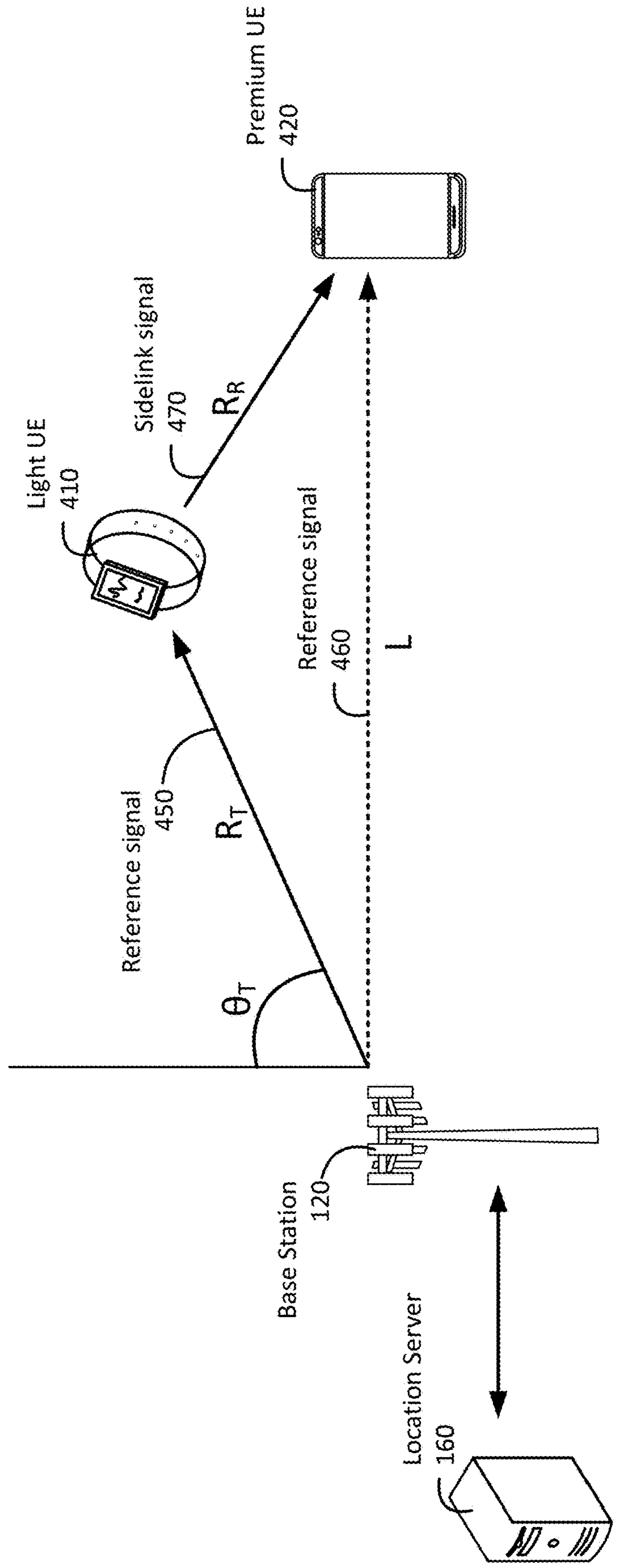
FIG. 4 is a simplified diagram illustrating how a network-based position determination of a light UE may be made using a single base station, according to an embodiment.

Embodiments provided herein address these and other issues by providing techniques in which the position of a light UE may be determined with high accuracy using a single base station. This is accomplished by leveraging a premium UE having a known location relative to the base station. Techniques can be used for UE-assisted and UE-based positioning. FIG. 4 helps illustrated how this is accomplished. In FIG. 4 is a simplified diagram illustrating how a network-based position determination of a light UE 410 may be made using a single base station 120 (e.g., the serving base station of the light UE 410 and/or premium UE 420), according to an embodiment. Here, positioning of the light UE 410 is accomplished using communications with a premium UE 420, where both light UE 410 and premium UE 420 receive reference signals 450, 460 from the base station 120. This positioning may be facilitated with the use of a location server 160.

The position of the light UE 410 can be determined mathematically by solving for the distance, $R_T$, of the light UE 410 from the base station 120, as well as angle, $\theta_T$. It can be noted that the baseline from which the angle $\theta_T$ is measured may be measured from true north or based on any coordinate system used by the network for positioning (e.g., geographical coordinates, East-North-Up (ENU), etc.). Solving for these two variables can be accomplished with the help of the premium UE 420, which can measure a reference signal 460, as well as a sidelink signal 470 provided by the light UE 410 in response to the light UE receiving reference signal 450.

The distance $R_T$ can be determined based on a time difference at the premium UE 420 of receiving the reference signal 460 and sidelink signal 470. Where $R_{sum}$, is the combined distance of distance $R_T$ and the distance, $R_R$, between the light UE 410 and premium UE 420, then solving for $R_T$ results in the following expression:

$$R_T = R_{sum} - R_R. \tag{1}$$

If L is defined as the distance between the base station 120 and premium UE 420, then equation (1) can be modified as follows:

$$R_T = \frac{R_{sum}^2 - L^2}{2[R_{sum} - L * \sin(\theta_T)]}. \tag{2}$$

Because the location of the premium UE 420 is known (or can be determined beforehand), distance L and angle $\theta_R$ can be obtained based on this premium UE location and the known location of the base station 120 (e.g., from an almanac of base station locations stored by the location server 160 and/or premium UE 420). Additionally, as explained in further detail below, $\theta_T$ can be determined from an AoD measurement of a reference signal transmitted by the base station 120 (which may be different than the reference signal 450 used to determine distance $R_T$) Thus, once $R_{sum}$ is determined, range $R_T$ can be determined using equation (2).

To solve for $R_{sum}$, embodiments can determine differences in times at which the reference signal 450 is received at the light UE 410 and reference signal 460 is received at premium UE 420. The sidelink signal 470 sent from the light UE 410 to the premium UE 420 can be triggered by the receipt of the reference signal 450 at the light UE 410, and a time at which the reference signal 450 is received at the light UE 410 can be relayed to the premium UE 420 using a sidelink connection as well. An illustration of this is provided in FIG. 5.

Figure 5:
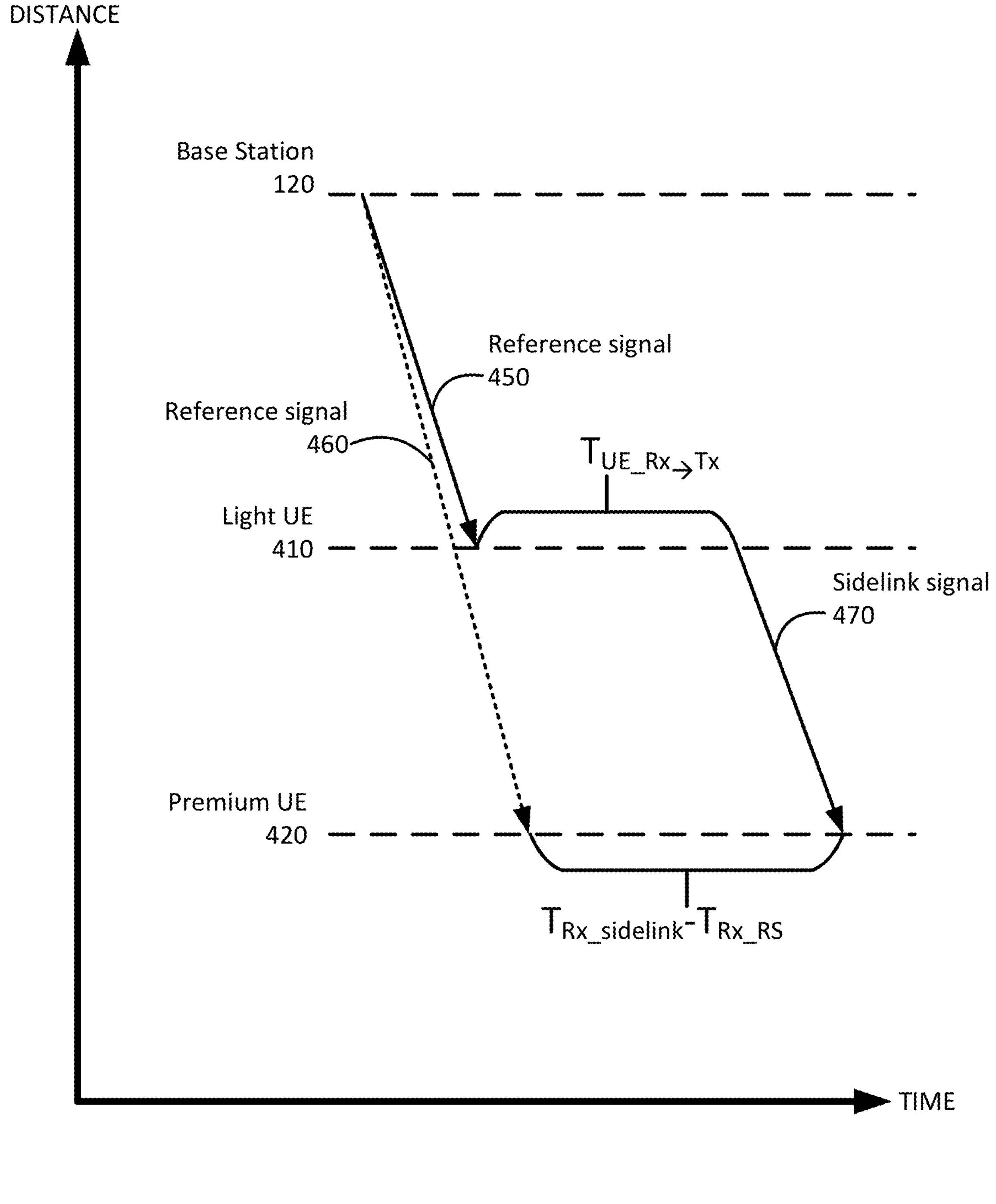
FIG. 5 is a time-distance diagram illustrating how timing can be used to determine certain mathematical values related to the configuration shown in FIG. 4, according to an embodiment.

FIG. 5 is a time-distance diagram illustrating how timing can be used to determine $R_{sum}$, in the configuration shown in FIG. 4, according to an embodiment. Here, a base station 120 transmits reference signals 450 and 460 (e.g., a DL-PRS), which our received by both the light UE 410 (which receives reference signal 450 first) and the premium UE 420.

The different angles of reference signals 450 and 460 in FIG. 5 reflect the different paths of reference signals 450 and 460 in FIG. 4.

As explained in further detail below, reference signal 450 and reference signal 460 may comprise the same or different reference signals. (Because reference signals 450 and 460 in FIG. 5 are illustrated as being transmitted at the same time, this would be reflective of transmission of a single reference signal. But embodiments are not so limited.) The location server 160 may coordinate the transmission and measurement of the reference signal(s) by providing information to the base station 120 regarding how to transmit the reference signal(s), as well as information to the light UE 410 and premium UE 420 regarding when to measure the reference signal(s).

Because reference signals travel at approximately the speed of light, c, the value for $R_{sum}$ can be determined from:

$$R_{sum}=(T_{Rx\_sidelink}-T_{Rx\_RS}-T_{UE\_Rx\rightarrow Tx})*C+L, \tag{3}$$

where $T_{Rx\_sidelink}$ is the time (ToA) at which the sidelink signal 470 is received by the premium UE, $T_{Rx\_Rs}$ is the time (ToA) at which the reference signal 460 is received by the premium UE, and $T_{UE\_Rx\rightarrow Tx}$ is the Time difference between the time (ToA) at which the light UE 410 receives the reference signal 450 and the time at which the light UE 410 transmits the sidelink signal 470. With the value of $R_{sum}$, distance $R_T$ can be determined from equation (2) above, and the position of the light UE 410 can be determined based on distance $R_T$, angle $\theta_T$, and the position of the base station 120. Because the value of $R_{sum}$ is based on a difference between times at which the light UE 410 and premium UE 420 receive the reference signal, no synchronization is required between the light UE 410, premium UE 420, or base station 120 to perform the positioning of the light UE 410 using the techniques described herein.

Figure 6A:
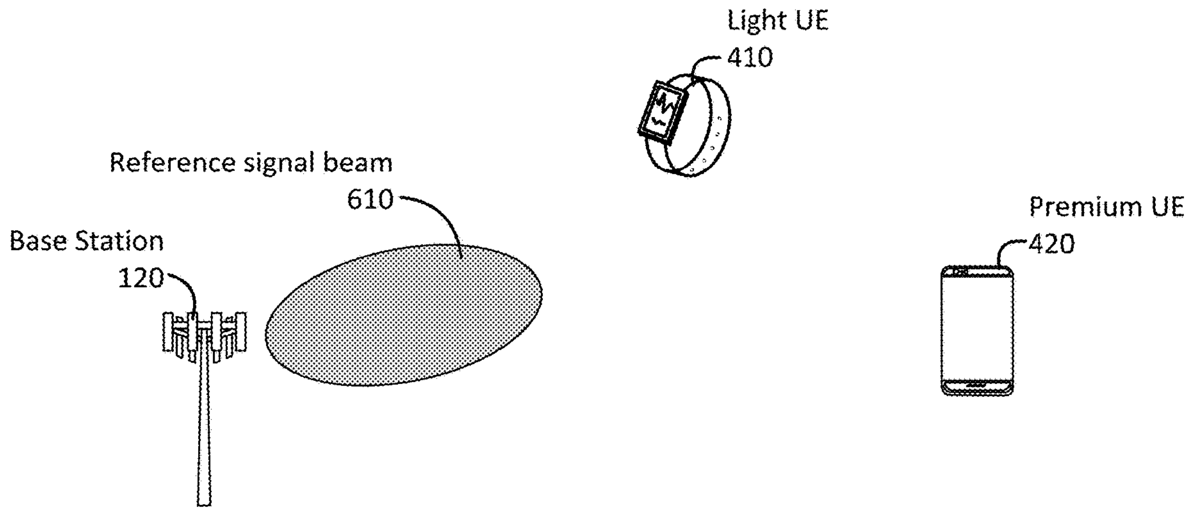
FIGS. 6A and 6B are diagrams of a base station, light UE, and premium UE, provided to illustrate how beams may be used differently in different embodiments and/or situations, depending on desired functionality.
Figure 6B:
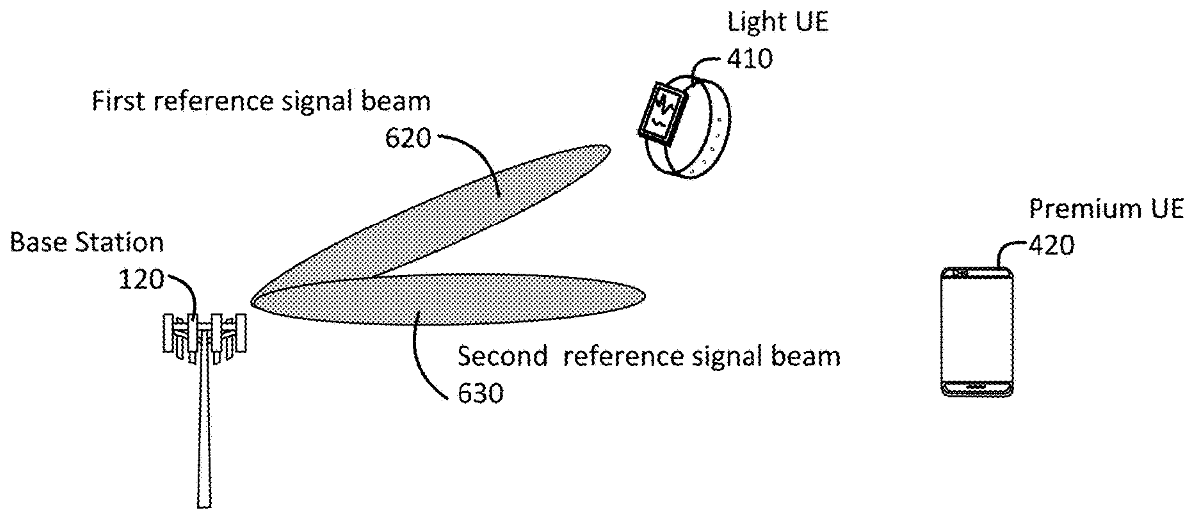

As noted, depending on desired functionality, a single reference beam may be used for the determination of distance $R_{sum}$ as described in relation to FIGS. 4 and 5. FIGS. 6A and 6B illustrate an example of this.

FIGS. 6A and 6B are diagrams of a base station 120, light UE 410, and premium UE 420 similar to those shown in FIG. 4, provided to illustrate how beams may be used differently in different embodiments and/or situations, depending on desired functionality. In FIG. 6A, for example, a single reference signal beam 610 is wide enough to be received by both light UE 410 and premium UE 420, allowing it to be used in the previously-described process regarding determining $R_{sum}$. As can be seen, whether the reference signal beam 610 is sufficiently wide may depend not only on the width of the reference signal beam, but also how close the light UE 410 and the premium UE 420 are to each other. (In some instances, for example, the light UE 410 and premium UE 420 may be sufficiently close such that a relatively narrow beam—as illustrated in FIG. 6B, for example—may be used by both the light UE 410 and premium UE 420.) In FIG. 6B, however, the light UE 410 is aligned with a first reference signal beam 610, and a premium UE 420 is more aligned with a second reference signal beam 630. In such instances, even if the premium UE 420 is capable of detecting both first reference signal beam 620 and a second reference signal beam 630, it may be preferable for the premium UE 420 to take a ToA measurement of the second reference signal beam 630, rather than the first reference signal beam 620 (e.g., due to more favorable SNR values to take a ToA measurement). Although reference signal beams 620, 630 may be transmitted at different times, because the time difference in the transmission of first reference signal beam 620 and the second reference signal beam 630 is known, this time difference can be accounted for in equation (3), allowing for the determination of $R_{sum}$ in cases where different reference signal beams transmitted at different times are used.

Figure 7:
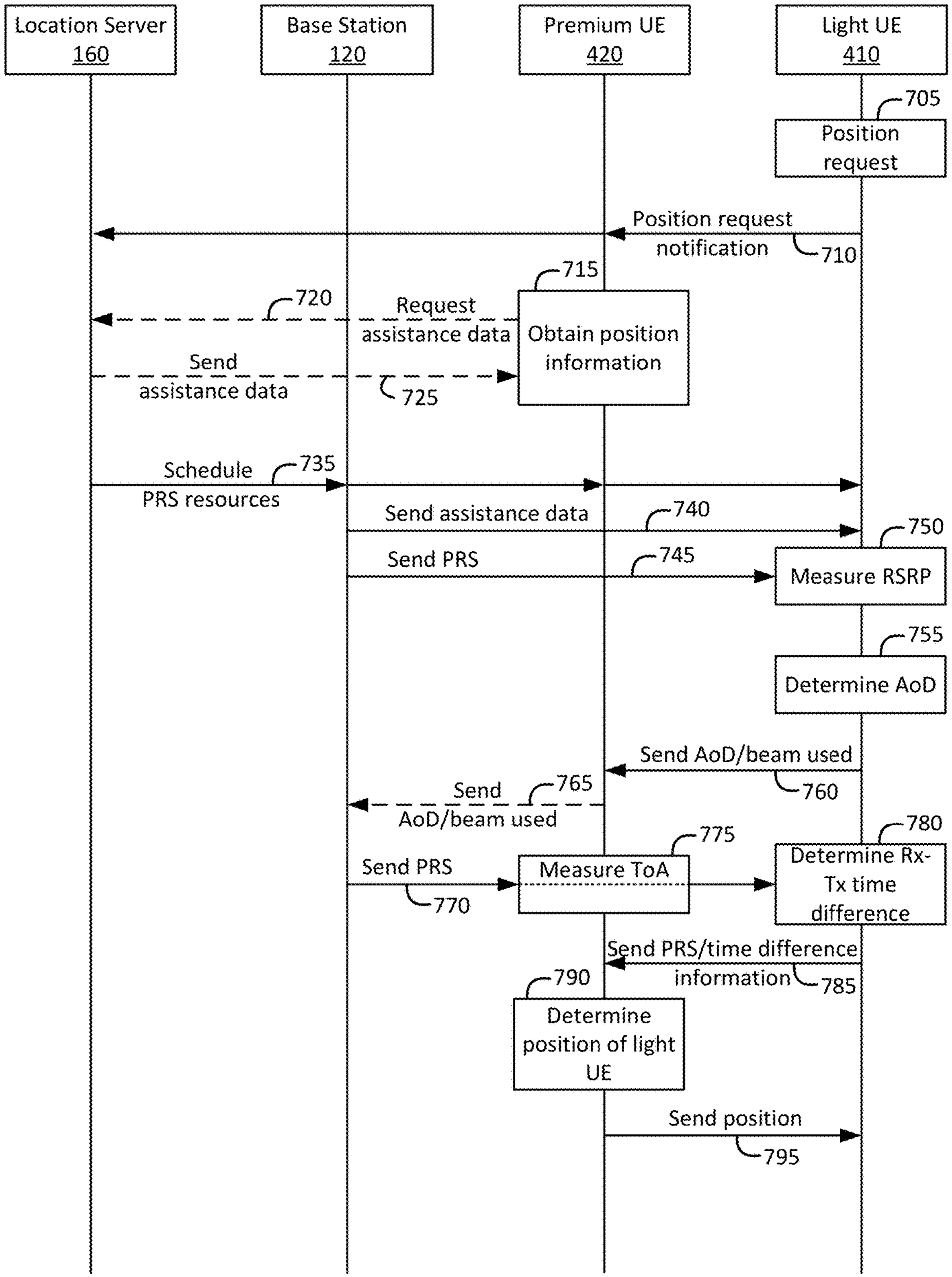
FIGS. 7-9 are call-flow diagrams of processes of performing position determination of a light UE, according to some embodiments.
Figure 8:
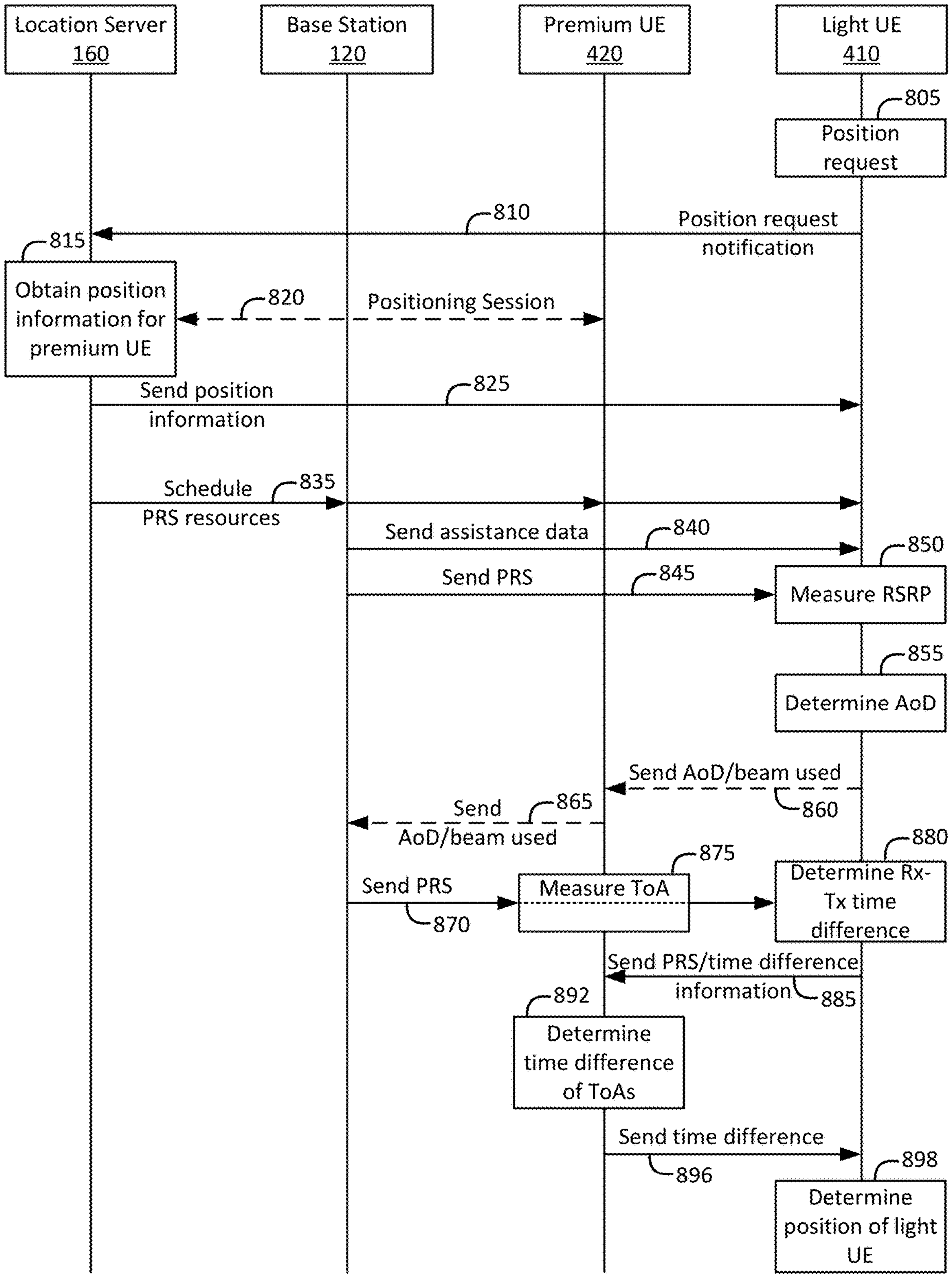
Figure 9:
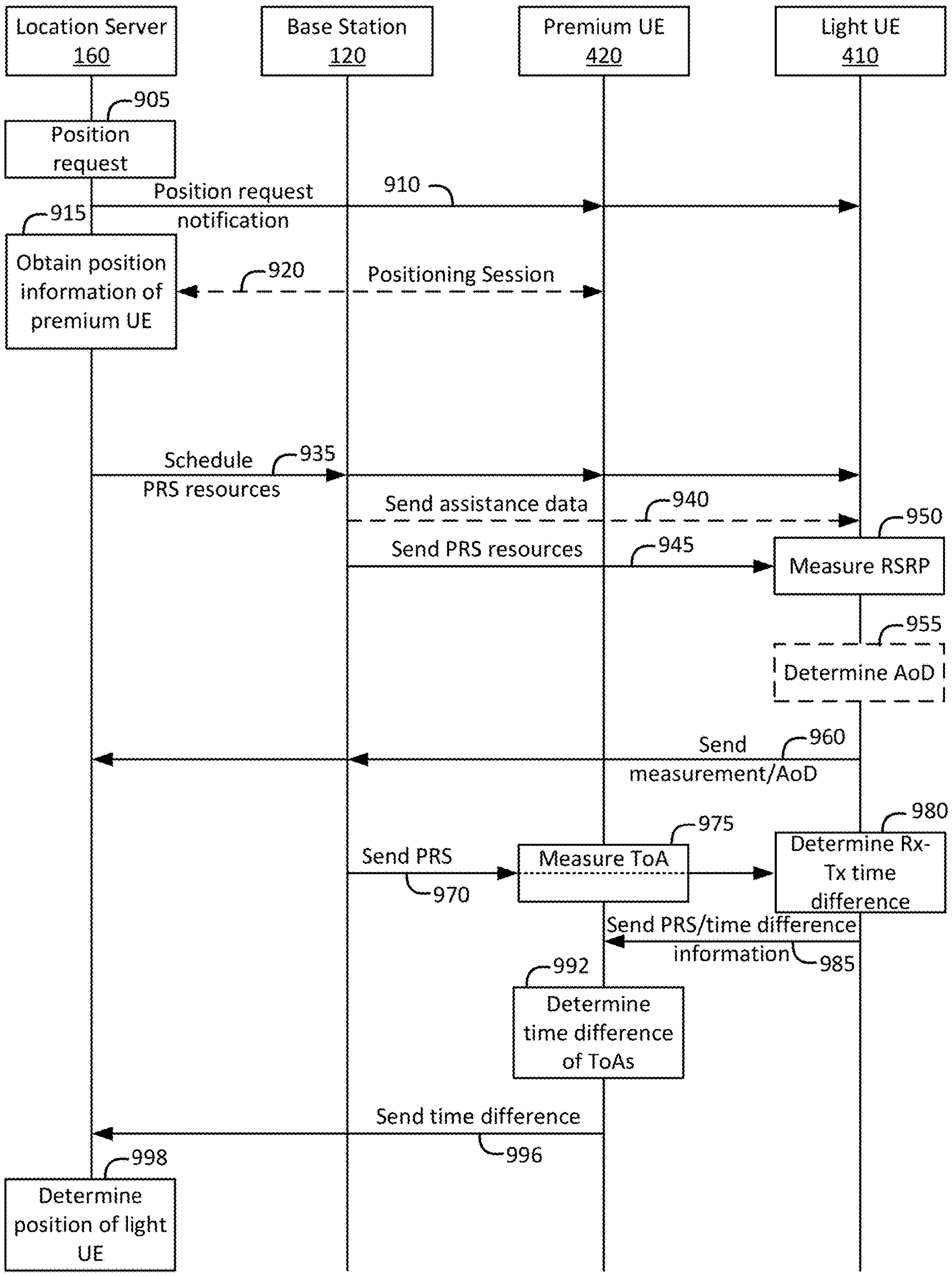

The calculation of the position of the light UE 410 and/or values distance $R_T$ and angle $\theta_T$ may be performed by different entities, depending on desired functionality. This may depend, for example, on whether the position of the light UE 410 is UE-based (e.g., where the request for the position of the light UE 410 comes from the light UE 410 itself) or whether it is UE-assisted (e.g., where the request for the position of the light UE 410 comes from the network or other entity outside the light UE, such as the external client 180 of FIG. 1 or external client 230 of FIG. 2). Accordingly, different processes can be used to determine the position of the light UE 410. FIGS. 7-9 illustrate some example processes.

FIG. 7 is a call-flow diagram illustrating an embodiment of a process of performing UE-based position determination of a light UE 410, in which some calculations are offloaded to the premium UE 420. As with the other figures provided herein, FIG. 7 is provided as a nonlimiting example. As discussed in more detail below, alternative embodiments may perform certain functions (e.g., the determination of the premium UE position, the AoD measurement, the ToA measurements, etc.) in a different order, simultaneously, etc. It can be noted that arrows between the various components illustrated in FIG. 7 illustrate messages or information sent from one component to another. It will be understood, however, that there may be any number of intervening devices, servers, etc. that may relay such messages, including other components in FIG. 7. (E.g., a message from the light UE 410 to the location server 160 may pass through the base station 120 and perhaps the premium UE 420.) Additionally, although wireless reference signals are referred to as PRS (e.g., DL-PRS transmitted by the base station 120), alternative embodiments may utilize other wireless reference signal types.

At block 705, the light UE 410 obtains a position request. This position request may come, for example, from an application (or app) executed by the light UE 410. This may be a result from user interaction with the light UE 410, based on a determined schedule, or based on other triggers. Additionally or alternatively, a position request may come from a separate device (e.g., it the premium UE 420 or another device in communication with the light UE 410) requesting the position of the light UE 410.

In response, the light UE 410 may generate a position request notification. As indicated at arrow 710, the request can be sent to the location server 160, which can coordinate the functionality of the various components illustrated in FIG. 7 to determine of the position of the light UE 410. According to some embodiments, additional communications between the light UE 410 and location server 160 may occur to determine capabilities of the light UE 410 (including, for example, the capability of the light UE 410 to communicate with the premium UE 420). In some embodiments, communication between the location server 160 and light UE 410 may occur via an LPP positioning session.

As illustrated, according to some embodiments the position request notification may additionally be sent to the premium UE 420. This can notify the premium UE 420 of the position request received by the light UE 410 (at block 705) and trigger the premium UE 420 to obtain its position information, at block 715. Here, too, the position request notification provided to the premium UE 420 may be part of a larger communication exchange in which positioning capabilities are shared between the light UE 410 and premium UE 420. According to some embodiments, location between the light UE 410 and premium UE 420 may occur over an existing sidelink connection. Alternatively, a new sidelink connection may be created in response to the position request received at block 705. According to some embodiments, rather than the light UE 410 providing the position request notification at arrow 710, the notification may be provided by the location server 160, in response to the location server's receipt of the position request notification at arrow 710.

The selection of a premium UE 420 to use in the position determination of the light UE 410 may be made in any of a variety of ways, depending on desired functionality. For example, as noted, the light UE 410 may have an existing sidelink communication channel with a premium UE 420 that can be leveraged for positioning purposes. In such instances, the premium UE 420 may be selected based on an existing sidelink channel. Additionally or alternatively, the premium UE 420 may be selected by the light UE 410 based on a scan of nearby premium UEs as well as a confirmed capability of performing positioning and this manner. Some embodiments may use a signal quality metric such as SNR and/or RSSI, for example, to select of the premium UE 420. Signal quality measures can be used to select a premium UE 420 that has adequate signal quality to perform the functions described herein, while not being too close to the light UE 410 to result in positioning errors for the position determination of the light UE 410. Accordingly, in such embodiments, a certain range of SNR and/or RSSI values may be selected to balance these considerations, and premium UEs having SNR and/or RSSI values that fall within this range may be selected over other premium UEs having SNR and/or RSSI values falling outside this range. Other embodiments may utilize additional or alternative techniques for premium UE selection.

At block 715, the premium UE 420 determines its location. This can be performed in any of a variety of ways, including GNSS and/or other non-network means. Additionally or alternatively, position determination for the premium UE 420 can be network-based and may involve the location server 160. In such instances, the premium UE 420 may request assistance data, as indicated by arrow 720, and the location server 160 may send the requested assistance data at arrow 725. In some embodiments, the premium UE 420 may obtain a high-accuracy position determination based on, for example, multi-RTT positioning based on communication with a plurality of base stations (which may include communication with the base station 120). For multi-RTT positioning, assistance data may include a location of each base station with which RTT measurements are made.

As indicated by arrow 735, the location server can then schedule the transmission and receipt of PRS resources by the base station 120, premium UE 420, and the light UE 410. According to embodiments, this may include the scheduling of PRS for both the measurement of RSRP by the light UE 410 (at block 750) and the measurement of ToA (at blocks 775 and 780) by both the light UE 410 and premium UE 420. Alternatively, these different PRS may be scheduled at different times. The scheduling of PRS resources may also involve the location server 160 configuring the base station 120 to provide assistance data to the light UE 410 for AoD determination. In some embodiments, the base station 120 may configure the premium UE 420 and/or light UE 410 to measure the PRS. (In such instances, the scheduling of PRS resources may be viewed as being sent from the base station 120, rather than the location server 160, to the premium UE 420 and/or light UE 410.)

At arrow 740, the assistance data is sent from the base station 120 to the light UE 410. Here, the assistance data can be used to enable the light UE 410 to determine the AoD based on an RSRP measurement of a PRS transmitted by the base station 120. As such, it may include beam width and boresight information of the PRS. Timing and/or other information regarding the PRS may be included in the assistance data as well.

At block 745, the base station 120 transmits the PRS, which is measured by the light UE 410 in an RSRP measurement, as indicated at block 750. As previously indicated, the base station 120 may transmit the PRS as part of a beam sweep, in which different PRS resources are transmitted using different beams. In this way, the resulting measured RSRP at block 750 may indicate the beam with which the light UE 410 is most closely aligned (e.g., the beam corresponding to the PRS having the highest RSRP value). The light UE 410 can then determine the AoD, at block 755, using the measured RSRP values and assistance data. As previously noted, the AoD may correspond with (or used to be determine) angle $\theta_T$ of FIG. 4.

As an alternative to the light UE 410 determining the AoD, the determination of the AoD may be made by the premium UE 420, according to some embodiments. This can reduce the amount of computation (and corresponding processing resources and power) performed by the light UE 410. In such embodiments, the RSRP measurements may be provided to the premium UE 420, which went may determine the AoD based on the RSRP measurements and assistance data. (In these embodiments, the assistance data would be provided by the base station 120 or location server 160 to the premium UE 420, rather than the light UE 410, at arrow 740.)

The determined AoD can then be sent to the premium UE 420, as indicated by arrow 760, to enable the premium UE 420 to subsequently calculate the position of the light UE 410. Optionally, the determined AoD (and/or an indication of the beam with which the light UE 410 is most closely aligned) can be sent to the base station 120 (as shown at arrow 765). This can be to indicate to the base station 120 which beam to subsequently use when sending PRS to the light UE 410 for ToA measurements. Because the premium UE 420 may be closer to the light UE 410 then the base station 120, the light UE 410 can save power by transmitting to the premium UE 420, rather than transmitting directly to the base station 120. Thus, the AoD and/or beam used may be sent from the light UE 410 to the premium UE 420, which then relays the information to the base station 120.

At arrow 770, the base station 120 can then send PRS, which can be measured by the premium UE 420 and light UE 410 as previously described and illustrated in FIG. 5. More particularly, the premium UE 420 measures the ToA of the PRS at block 775, and at block 780 the light UE 410 measures the ToA of the PRS and determines an Rx-Tx time difference (e.g. $T_{UE\_Rx\rightarrow Tx}$ of FIG. 5) between a time the PRS is received at the light UE 410 and a time the light UE transmits a PRS (at arrow 785) to be received by the premium UE 420. As noted in the previously-described embodiments, alternative embodiments may send a different PRS (e.g., a PRS resource using a different beam) for ToA measurement at block 775 than the PRS received by the light UE 410 block 780.

At arrow 785, the light UE 410 then sends a PRS to the premium UE 420, along with the Rx-Tx time difference. As previously described, the PRS may comprise a signal (e.g., sidelink signal 470) sent via a sidelink communication channel. This can comprise, for example, a sidelink PRS (SL-PRS), or other reference signal that can provide for an accurate ToA measurement by the premium UE 420.

At block 790, the premium UE 420 determines the position of the light UE 410. More specifically, using the AoD received at arrow 760 and determining the distance ($R_T$) of the light UE 410 from the base station 120 (e.g., using equation (2) above), and a known location for the base station 120, the premium UE 420 can determine the position of the light UE 410. This determined position can then be sent to the light UE, as indicated by arrow 795. The known location of the base station 120 may be obtained by the premium UE 420 based on an almanac of base station locations, which may be stored at the premium UE 420 (and used for positioning of the premium UE 420, for example) or location server 160. If stored at the location server 160, the location server may provide the location of the base station 120 as assistance data in previous communications (e.g., at arrow 725, arrow 735, or separately-communicated assistance data (not shown)).

FIG. 8 is call-flow diagram illustrating an embodiment of another process of performing UE-based position determination of a light UE 410. In contrast to the process illustrated in FIG. 7, however, calculations and position determination are performed at the light UE 410 itself. As can be seen, many of the operations performed in the process of FIG. 8 may be similar to the operations performed in the process of FIG. 7.

The position request at block 805 and position request notification at arrow 810 may be similar to corresponding operations in FIG. 7. In this embodiment, however, the position request is provided directly to the location server 160, which obtains the position information for the premium UE at block 815. Again, communications to the location server 160 may be relayed through the premium UE 420 to reduce the amount of transmission power for the light UE 410 required to send the position request notification at arrow 810. In such instances, the position request notification may be sent via a sidelink communication channel between the light UE 410 and premium UE 420.

As illustrated, obtaining the position information for the premium UE at block 815 may optionally include a positioning session between the location server 160 and premium UE 420, as indicated by arrow 820. For example, the location server 160 may request to the position of the premium UE 420, which may be provided to the location server 160, if known. Otherwise, UE-assisted positioning of the premium UE 420 may be performed. When the position of the premium UE 420 is obtained, the location server 160 can then send the position information to the light UE 410, as indicated at block 825.

As indicated at arrow 835, the location server 160 can schedule PRS resources, as described previously in regard to FIG. 7. This can result in the base station 120 sending assistance data to the light UE 410, as indicated at arrow 840. Further, the assistance data may also include a location of the base station 120, which (along with the position of the premium UE 420) can be subsequently used to determine the position of the light UE 410.

The elements 845-885 may be similar to corresponding actions in FIG. 7. One difference is that in the process of FIG. 8, the AoD is not needed by the premium UE 420 for determining the position of the light UE 410 (because the light UE 410 determines its own location). Accordingly, the action at arrow 860 is optional. Unless, the light UE 410 may send the AoD or been used to the premium UE 420 so that the premium UE can relay this information to the base station (at arrow 865), which may impact how the PRS is sent at arrow 870, as previously noted.

At block 892, rather than calculate the location of the light UE 410, the premium UE 420 can determine the time difference of the ToAs (e.g., $T_{RX\_sidelink}-T_{RX\_Rs}$, of equation (3) and FIG. 5), which can be provided to the light UE 410, as indicated at arrow 896. With this information, along with the AoD and location information for the premium UE 420 and base station 120, the light UE 410 can determine its position, as shown at block 898, in the manner described above.

FIG. 9 is call-flow diagram illustrating an embodiment of a process of performing UE-assisted position determination of a light UE 410. Here, calculations and position determination are performed at the location server 160, based on information received from the premium UE 420 and light UE 410. Many of the operations performed in the process of FIG. 9 may be similar to the operations performed in the processes of FIGS. 7 and 8, as previously described.

This process may begin with a position request obtained at the location server 160, as indicated at block 905. As indicated previously, UE-assisted (or network-based) positioning can be based on a request from an external client (e.g., external client 180 of FIG. 1 and/or external client 230 of FIG. 2). Additionally or alternatively, the request may come from a service within the wireless network that may need the position of the light UE 410 to provide particular functionality.

In response to the position request, the location server 160 may notify the light UE 410 and (optionally) premium UE 420 of the position request via position request notification, as indicated at arrow 910. In some embodiments, this may comprise initiating a communication session between the location server 160 and light UE 410, and/or between the location server 160 and premium UE 420.

Elements 915-955 may be similar to corresponding features in FIG. 8, as previously described. In FIG. 9, the determination of the AoD may be made by the light UE 410 or by the location server 160. If the determination is made by the location server 160, the light UE 410 can provide RSRP measurements to the location server 160, as shown in arrows 960, and the assistance data does not need to be sent from the base station 122 the light UE 410 at arrow 940. (Again, this may be sent via the premium UE 420, which may result in reduced transmission power.) Otherwise, the assistance data can be sent by the base station 120, and the AoD may be determined by the light UE 410 at block 955, using the assistance data, and sent to the location server 160 (at arrow 960). As with the processes illustrated in FIGS. 7 and 8, the RSRP measurement and/or AoD determination can be sent to the base station 120, which may inform which beam to use when sending the PRS at arrow 970.

Elements 970-996 may be similar to corresponding elements in FIG. 8. The difference in FIG. 9, however, is that the time difference is sent from the premium UE 420 to the location server 160 (rather than to the light UE 410), at arrow 996. With this information, the location server 160 can then determine the position of the light UE, at block 998.

Figure 10:
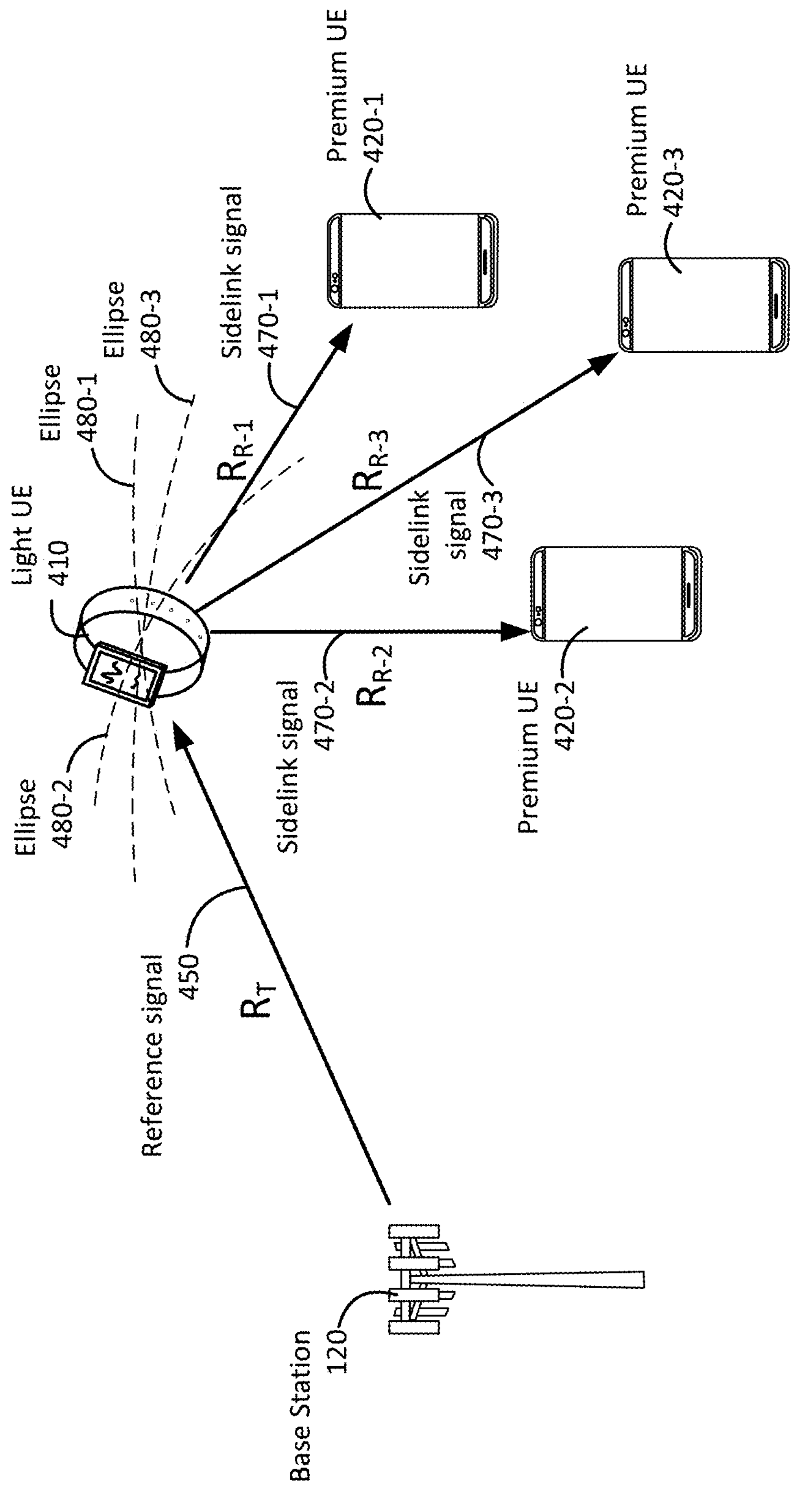
FIG. 10 is a simplified diagram illustrating how a network-based position determination of a light UE may be made using a single base station and multiple premium UEs, according to an embodiment.

FIG. 10 is a simplified diagram illustrating a variation to the configuration illustrated in FIG. 4, which may be performed according to embodiments. Here, rather than a single premium UE 420, multiple premium UEs 420-1, 420-2, and 420-3 (collectively and generically referred to herein simply as premium UEs 420) are used.

The process of determining the location of the light UE 410 may be generally similar to the process illustrated in FIG. 4 and described in conjunction with FIGS. 4-9. However, because multiple premium UEs 420 are used, angle information may not be needed. That is, rather than (or in addition to) determining the position of the light UE 410 using distance $R_T$ and angle $\theta_T$, the position may be determined instead using multi-lateration. That is, each premium UE 420 can receive a respective sidelink signal 470 from the light UE 410, as well as a direct reference signal from the base station 120 (similar to reference signal 460 and FIG. 4) to determine a respective determine using equation (3). (To reduce clutter, direct reference signals are not illustrated in FIG. 10.) Because is the $R_{sum}$ of $R_T$ and the respective $R_R$ for each premium UE 420, the value of $R_{sum}$ can be used to form a respective ellipse 480 for each premium UE 420 in which the base station 120 and premium UE 420 are foci of the respective ellipse. (Again, to reduce clutter, only applicable portions of ellipses 480 are illustrated in FIG. 10) The device determining the location of the light UE 410 (e.g., the light UE 410, any/all of the premium UEs 420, or the location server 160 (not illustrated in FIG. 10)) may do so by determining the pointed which the ellipses 480 converge. As such, no AoD or other angular determinations may be needed. Even so, according to some embodiments, an AoD may be determined and sent to the base station 120 as described previously (e.g., relating to actions 935-970 of FIG. 9) to enable the base station 120 to select a beam with which to transmit the reference signal 450.

The number of premium UEs 420 used to determine the position of the light UE 410 in this manner may vary, depending on the situation. A larger or smaller number of premium UEs 420 than illustrated in FIG. 10, for example, can be used. In some circumstances, such as when two premium UEs 420 are used, there may be ambiguities (e.g., multiple convergence points) in the position of the light UE 410. In such instances, other data can be leveraged to resolve the ambiguities. This other data can include, for example, tracking information for the light UE 410, other (previous and/or simultaneous) position determinations for the light UE 410, or the like.

It can be noted that embodiments for determining the location of the light UE 410 in the manner illustrated in FIG. 10 may follow a similar process as those illustrated in FIGS. 7-9. (As noted above, a determination of AoD by the light UE 410 may be optional. Thus, actions related to the AoD determination described in FIGS. 7-9 may be optional as well.) Because multiple premium UEs 420 are used, the functionality of the premium UE 420 illustrated in FIGS. 7-9 may be replicated for all premium UEs 420. That said, the determination of the position of the light UE at block 790 of FIG. 7 (and accompanying actions 785 and 795) may be performed by a single premium UE 420, if desired.

It also can be noted that reference signals and sidelink signals may be the same or different, depending on desired functionality. For example, a single reference signal 450 may be sent to the light UE 410, which may then send respective sidelink signals 470 to each of the premium UEs 420. In another example, the light UE 410 may receive a single reference signal 450 and send a single sidelink signal 470 to all or a subset premium UEs 420. Alternatively, a different reference signal 450 may be used for each premium UE 420 such that, for each premium UE, the light UE 410 receives a respective reference signal 450 and sends a corresponding respective sidelink signal 470 to the premium UE. Different embodiments may employ different combinations of reference signals. Similarly, one or more reference signals from the base station 120 to the premium UEs 420 (not illustrated in FIG. 10 but corresponding to reference signal 460 in FIG. 4) may be used. (E.g., if all premium UEs 420 are within a single beam, a single reference signal may be used. Alternatively, different reference signals may be sent to different premium UEs 420.)

Figure 11:
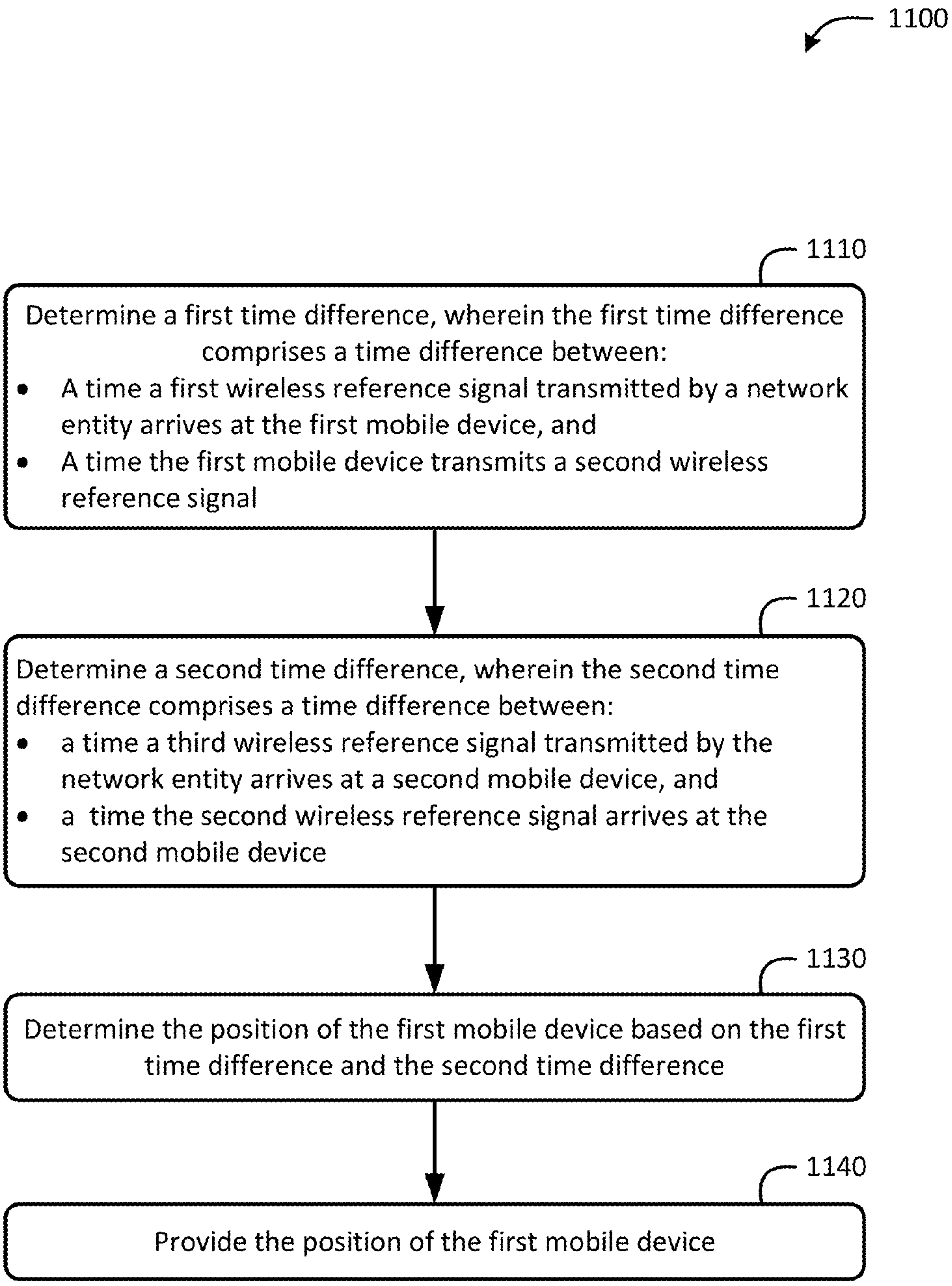
FIG. 11 is a flow diagram of a method of determining the position of a first mobile device, according to an embodiment.
Figure 12:
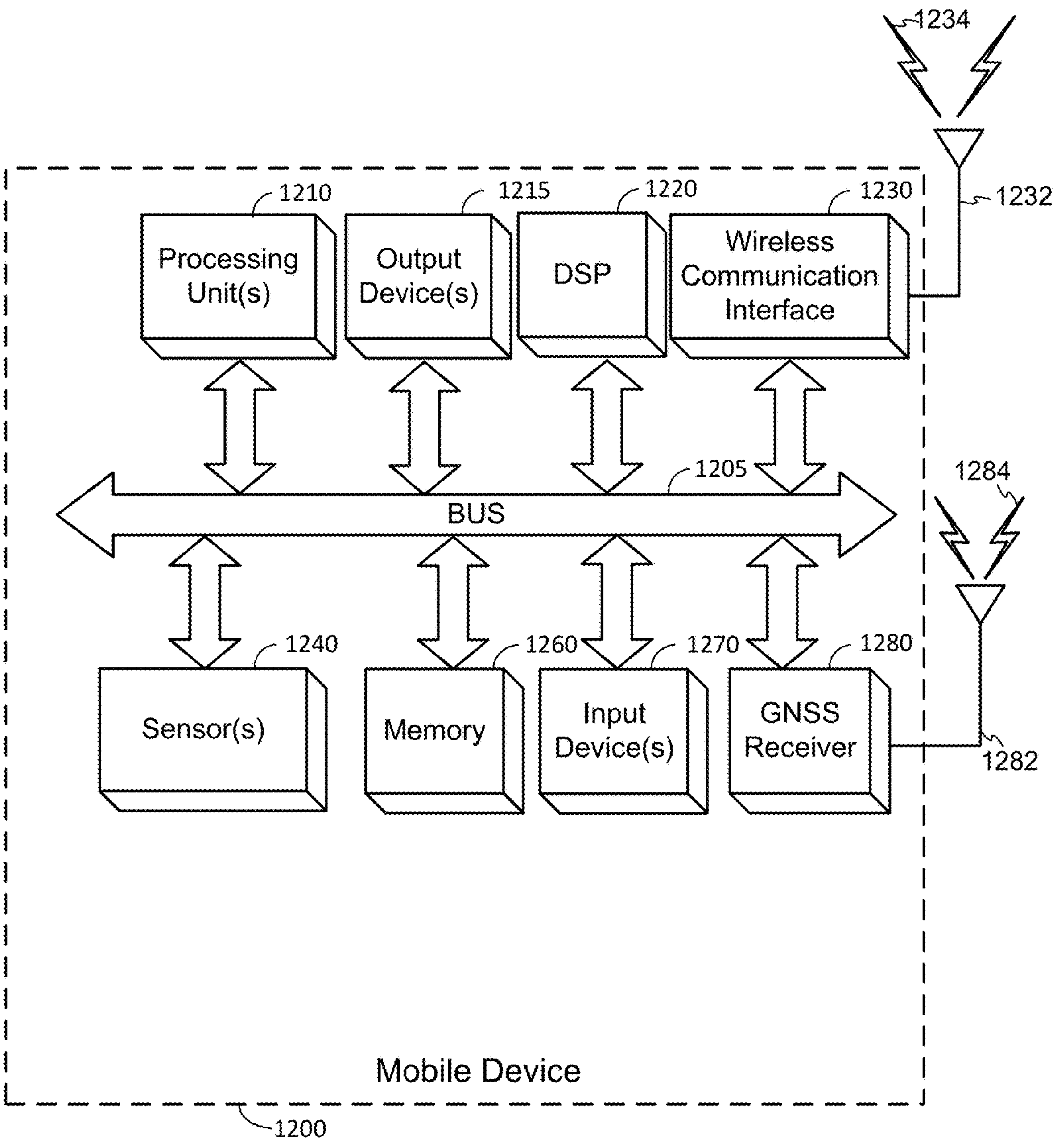
FIG. 12 is a block diagram of an embodiment of a mobile device, which can be utilized in embodiments as described herein.
Figure 13:
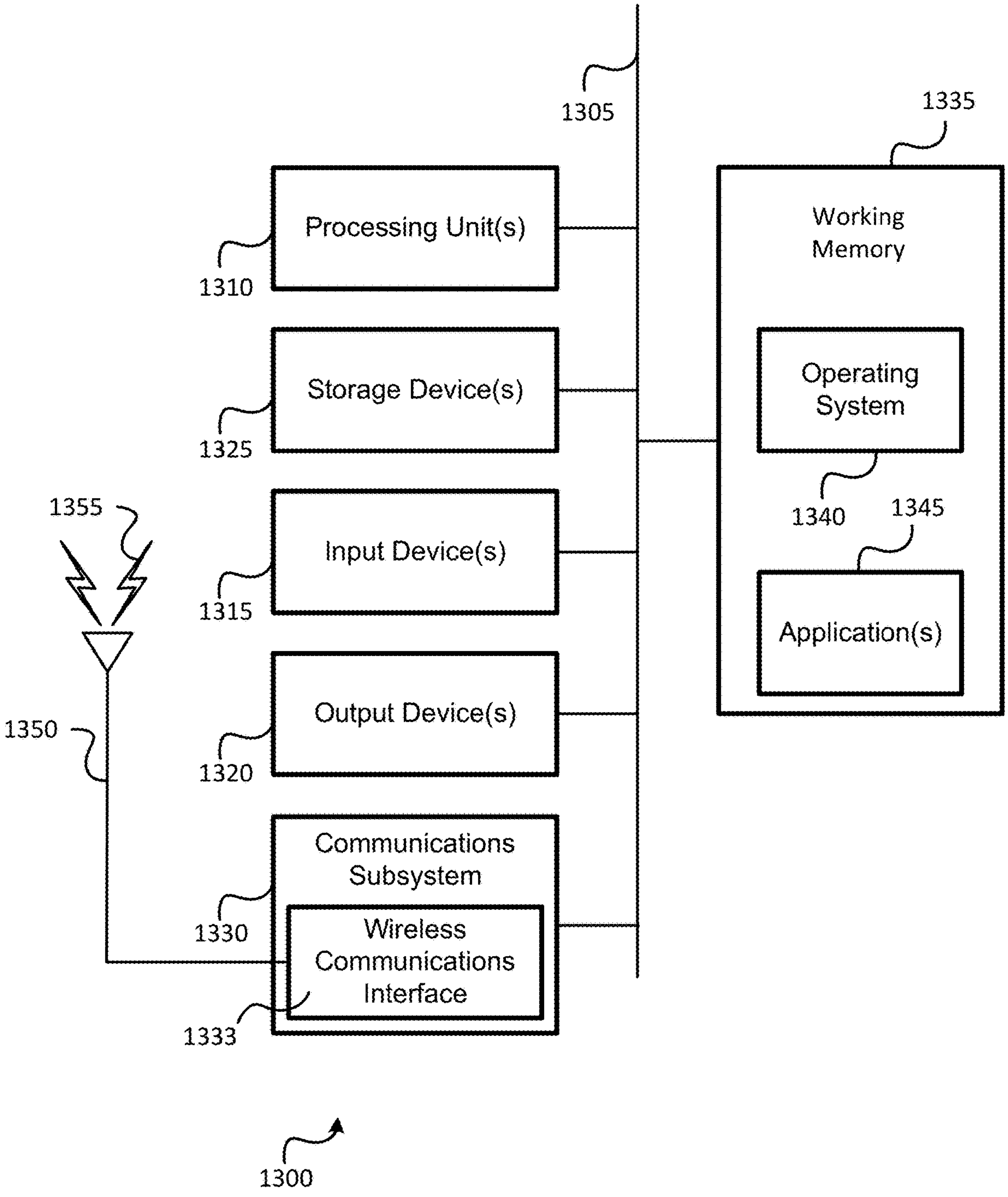
FIG. 13 is a block diagram of an embodiment of a computer system, which can be utilized in embodiments as described herein.

FIG. 11 is a flow diagram of a method 1100 of determining the position of a first mobile device, according to an embodiment. Here, the first mobile device may correspond with the light UE 410, and the second mobile device may correspond with the premium UE 420, as described in FIGS. 4-10. Further, as illustrated in the example processes of FIGS. 7-9 and the descriptions of FIGS. 4 and 10, the operations performed by different devices may vary, depending on whether positioning is UE-assisted or UE-based, and/or other factors. Accordingly, means for performing the functionality illustrated in one or more of the blocks shown in FIG. 11 may be performed by hardware and/or software components of a light UE 410, premium UE 420, or location server 160. Example components of a light UE 410 or premium UE 420 are illustrated in FIG. 12 (which generally describes a mobile device) and described in more detail below. Example components of a location server are illustrated in FIG. 13 (which generally describes a computer system) and described in more detail below.

At block 1110, the functionality comprises determining a first time difference, wherein the first time difference comprises a time difference between: (i) a time a first wireless reference signal transmitted by a network entity arrives at the first mobile device, and (ii) a time the first mobile device transmits a second wireless reference signal. An example of this first time difference is provided in equation (3) as $T_{UE\_Rx \rightarrow Tx}$, which, as noted, can be used to account for delays at the first mobile device (e.g., light UE 410) when determining $R_{sum}$. As indicated in the above-described embodiments, the first wireless reference signal (e.g., reference signal 450 in FIGS. 4 and 10) may be transmitted by a network entity comprising a base station. More broadly, the network entity may comprise any type of base station or TRP (including a gNB or eNB, for example). In some embodiments, a network entity may alternatively comprise another UE having a known location and capable of performing the operations of a base station as indicated in the previously-described embodiments. Where the network entity comprises a base station or TRP, the first wireless reference signal may comprise a downlink (DL) reference signal such as a PRS, SSB, Tracking Reference Signal (TRS), Channel State Information Reference Signal (CSIRS), Demodulation Reference Signal (DMRS), etc. Where the network entity comprises another UE, the first wireless reference signal may comprise a sidelink (SL) reference signal, such as an SL-PRS, DMRS, CSIRS, etc. The second wireless reference signal transmitted by the first mobile device may also comprise an SL reference signal. According to some embodiments, determining the first time difference is performed at the mobile device, which can measure/calculate the time difference based on a ToA of the first wireless reference signal and a time of transmission of the second wireless reference signal. Alternatively, the first time difference may be determined at the second mobile device or at a location server by receiving information indicative of the first time difference from the first mobile device.

Means for performing functionality at block 1110 may comprise a bus 1205, wireless communication interface 1230, digital signal processor (DSP) 1220, processing unit 1210, memory 1260, and/or other components of a mobile device, as illustrated in FIG. 12. Additionally or alternatively, means for performing functionality at block 1110 may comprise a bus 1305, communications subsystem 1330, processing unit(s) 1310, working memory 1335, and/or other components of a computer, as illustrated in FIG. 13.

At block 1120, the functionality comprises determining a second time difference, wherein the second time difference comprises a time difference between (i) a time a third wireless reference signal transmitted by the network entity arrives at a second mobile device, and (ii) a time the second wireless reference signal arrives at the second mobile device. An example of a second time difference is provided in equation (3) as $T_{Rx\_sidelink}-T_{Rx\_RS}$. As described in the embodiments above, ToA measurements may be taken by the second wireless device of the second wireless reference signal and the third wireless reference signal to determine this time difference. Alternatively, this time difference may be determined by the first mobile device or location server based on information received from the second mobile device (e.g., at arrow 896 of FIG. 8 or arrow 996 of FIG. 9). As noted, the first wireless reference signal and the third wireless reference signal may comprise the same signal in some embodiments. Alternatively, they may comprise distinctive reference signals. In the latter case, determining the position of the first mobile device may be further based on a difference in time between the transmission of the first wireless reference signal and the third wireless reference signal.

Means for performing functionality at block 1120 may comprise a bus 1205, wireless communication interface 1230, DSP 1220, processing unit 1210, memory 1260, and/or other components of a mobile device, as illustrated in FIG. 12. Additionally or alternatively, means for performing functionality at block 1120 may comprise a bus 1305, communications subsystem 1330, processing unit(s) 1310, working memory 1335, and/or other components of a computer, as illustrated in FIG. 13.

At block 1130, the functionality comprises determining the position of the first mobile device based on the first time difference and the second time difference. As described in the embodiments above, a relative position a light UE from a base station can be determined based on angle and distance from the base station. Accordingly, angle $\theta_T$ can be determined from the AoD and distance $R_T$ can be calculated in the manner above to determine a position of the first mobile device relative to a position of the base station. Moreover, the absolute position of the first mobile device can be determined in further view of the absolute position of the base station. As such, embodiments of the method 1100 may further comprise determining an AoD of the first wireless reference signal based on a measurement taken by the first mobile device, wherein determining the position of the first mobile device is further based on the AoD. Determining the AoD may comprise obtaining, with the second mobile device, assistance data from a location server; and receiving, with the second mobile device, the measurement taken by the first mobile device. In such instances, the AoD may be determined by the second mobile device based on the measurement and the assistance data. Here, the assistance data comprises boresight and beam width of the first wireless reference signal. Additionally or alternatively, the method may comprise sending with the second mobile device, an indication of the AoD to the network entity or the location server. In some embodiments, determining the AoD may comprise receiving, with a location server, the measurement taken by the first mobile device. In such embodiments, the AoD may be determined by the location server based on the measurement taken by the first mobile device.

As noted, an AoD may not necessarily be needed for determination of the position of the first mobile device. As indicated in FIG. 10, for example, the position of the first mobile device (the light UE 410) can be determined based on multi-lateration. Multi-lateration may be performed by calculating $R_{sum}$ for the second mobile device and one or more additional mobile devices. As such, according to some embodiments, the method 1100 may further comprise a third time difference, wherein the third time difference comprises a time difference between (i) a time a fourth wireless reference signal transmitted by the network entity arrives at a third mobile device, and (ii) a time the third mobile device receives a fifth wireless reference signal transmitted by the first mobile device. In such instances, determining position of the first mobile device may be further based on the third time difference.

In embodiments where the operations of FIG. 11 are performed at the first mobile device, functionality may vary. According to some embodiments, the method 1100 may further comprise receiving, with the first mobile device from the second mobile device, information indicative of the second time difference, receiving, with the first mobile device from the network entity or a location server, an indication of a position of the second mobile device relative to a position of the network entity, and determining, with the first mobile device, a distance between the first mobile device and the network entity based at least in part on the indication of the second time difference. In such embodiments, determining the position of the first mobile device maybe further based on the distance. In some embodiments, the indication of the position of the second mobile device relative to the position of the network entity may comprise a distance between the second mobile device and the network entity or a position of the network entity and a position of the second mobile device.

As noted in the previously-described embodiments, the determination of the position of the first mobile device may be based on different data (e.g., multi-lateration versus distance and angle from base station). In some embodiments, the distance (e.g., distance L in FIG. 4) between the network entity and second mobile device determining may be determined. As such, embodiments of the method 1100 may further comprise determining a distance between the second mobile device and the network entity, wherein determining the position of the first mobile device is further based on the distance between the second mobile device and the network entity.

Means for performing functionality at block 1130 may comprise a bus 1205, wireless communication interface 1230, DSP 1220, processing unit 1210, memory 1260, and/or other components of a mobile device, as illustrated in FIG. 12. Additionally or alternatively, means for performing functionality at block 1130 may comprise a bus 1305, communications subsystem 1330, processing unit(s) 1310, working memory 1335, and/or other components of a computer, as illustrated in FIG. 13.

At block 1140, the functionality comprises providing the position of the first mobile device. As previously noted, the way in which the position is provided can vary depending on circumstance. In some embodiments, for example, the second mobile device may determine the position of the first mobile device. In such cases, providing the position of the first mobile device may comprise sending the position of the first mobile device from the first mobile device to the second mobile device, or to a location server. Where the position is calculated by the first mobile device, the calculation may be performed on a specialized application or lower-level function, in which case providing the position of the first mobile device may comprise providing, the position of the first mobile device to an application executed by the first mobile device.

In instances in which UE-assisted positioning is performed, a location server may provide the position to a requesting entity. In such embodiments, to determine the distance between the first mobile device and the base station, a location server may receive, from the second mobile device, information indicative of the first time difference and/or second time difference from the second mobile device. The location server may further determine the position of the first mobile device and provide the position of the first mobile device. Such embodiments may further comprise receiving a request for the position of the first mobile device from a requesting entity, wherein providing the position of the first mobile device comprises sending the position of the first mobile device to the requesting entity.

In some embodiments, the frequency bands used to transmit the wireless reference signals may be different. For example, the first wireless reference signal may be in a first frequency band, and the second wireless reference signal in a second frequency band; one may be Time Division Duplex (TDD) the other Frequency Division Duplex (FDD); one may be in FR1 and the other in FR2, and so on. As such, according to some embodiments of the method 1100, the first wireless reference signal may be on a first wireless frequency band and the second wireless reference signal, the third wireless reference signal, or both, may be on a second frequency band.

Wireless reference signals may also be within a given time-domain window, depending on desired functionality. For example, according to some embodiments, the various network components may configured such that, if the first wireless reference signal is transmitted in a slot n (where slot n is a given slot in a Orthogonal Frequency-Division Multiplexing (OFDM) regime), the second and/or third wireless reference signals may need to be transmitted in slot n+k, such that they are within X ms of the first wireless reference signals. Here, the value for X could be, for example, 5, 10, 20 ms, etc.

Means for performing functionality at block 1140 may comprise a bus 1205, wireless communication interface 1230, DSP 1220, processing unit 1210, memory 1260, and/or other components of a mobile device, as illustrated in FIG. 12. Additionally or alternatively, means for performing functionality at block 1140 may comprise a bus 1305, communications subsystem 1330, processing unit(s) 1310, working memory 1335, and/or other components of a computer, as illustrated in FIG. 13.

FIG. 12 illustrates an embodiment of a mobile device 1200, which can be utilized as a light UE, premium UE, or other UE as described herein above (e.g., in association with FIGS. 1-10). For example, the mobile device 1200 can perform one or more of the functions of the method shown in FIG. 11. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 12.

The mobile device 1200 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as DSP chips, graphics acceleration processors, application specific integrated circuits (ASICs), and/or the like), and/or other processing structures or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below). The mobile device 1200 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The mobile device 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1200 to communicate with other devices as described in the embodiments above. The wireless communication interface 1230 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices (UEs/mobile devices, etc.) communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1200 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1200 can further include sensor(s) 1240. Sensors 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 1200 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the mobile device 1200, using conventional techniques, from GNSS satellites (e.g., GNSS satellites 110) of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1210, DSP 1220, and/or a processing unit within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1210 or DSP 1220.

The mobile device 1200 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the mobile device 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the mobile device 1200 (and/or processing unit(s) 1210 or DSP 1220 within mobile device 1200). In an aspect, then such code and/or instructions can be used to configure and/or adapt a general-purpose computer (or other device) to perform one or more operations in accordance with the described methods.

FIG. 13 is a block diagram of an embodiment of a computer system 1300, which may be used, in whole or in part, to provide the functions of one or more network components as described in the embodiments herein (e.g., location server 160 of FIGS. 1, 4, and 7-9). It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner. In addition, it can be noted that components illustrated by FIG. 13 can be localized to a single device and/or distributed among various networked devices, which may be disposed at different geographical locations.

The computer system 1300 is shown comprising hardware elements that can be electrically coupled via a bus 1305 (or may otherwise be in communication, as appropriate). The hardware elements may include processing unit(s) 1310, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1300 also may comprise one or more input devices 1315, which may comprise without limitation a mouse, a keyboard, a camera, a microphone, and/or the like; and one or more output devices 1320, which may comprise without limitation a display device, a printer, and/or the like.

The computer system 1300 may further include (and/or be in communication with) one or more non-transitory storage devices 1325, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1300 may also include a communications subsystem 1330, which may comprise wireless communication technologies managed and controlled by a wireless communication interface 1333, as well as wired technologies (such as Ethernet, coaxial communications, universal serial bus (USB), and the like). The wireless communication interface 1333 may send and receive wireless signals 1355 (e.g., signals according to 5G NR or LTE) via wireless antenna(s) 1350. Thus the communications subsystem 1330 may comprise a modem, a network card (wireless or wired), an infrared communication device, a wireless communication device, and/or a chipset, and/or the like, which may enable the computer system 1300 to communicate on any or all of the communication networks described herein to any device on the respective network, including a UE/mobile device, base stations and/or other TRPs, and/or any other electronic devices described herein. Hence, the communications subsystem 1330 may be used to receive and send data as described in the embodiments herein.

In many embodiments, the computer system 1300 will further comprise a working memory 1335, which may comprise a RAM or ROM device, as described above. Software elements, shown as being located within the working memory 1335, may comprise an operating system 1340, device drivers, executable libraries, and/or other code, such as one or more applications 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of determining a position of a first mobile device, the method comprising:
- determining a first time difference, wherein the first time difference comprises a time difference between:
- a time a first wireless reference signal transmitted by a network entity arrives at the first mobile device, and
- a time the first mobile device transmits a second wireless reference signal;
- determining a second time difference, wherein the second time difference comprises a time difference between:
- a time a third wireless reference signal transmitted by the network entity arrives at a second mobile device, and
- a time the second wireless reference signal arrives at the second mobile device;
- determining the position of the first mobile device based on the first time difference and the second time difference; and
- providing the position of the first mobile device.

Clause 2: The method of clause 1, further comprising determining an Angle of Departure (AoD) of the first wireless reference signal based on a measurement taken by the first mobile device, wherein determining the position of the first mobile device is further based on the AoD.

Clause 3: The method of clause 2, wherein determining the AoD comprises:
- obtaining, with the second mobile device, assistance data from a location server; and
- receiving, with the second mobile device, the measurement taken by the first mobile device; and
- wherein the AoD is determined by the second mobile device based on the measurement and the assistance data.

Clause 4: The method of clause 3, wherein the assistance data comprises boresight and beam width of the first wireless reference signal.

Clause 5: The method of clause 2 or 3, further comprising sending, with the second mobile device, an indication of the AoD to the network entity or the location server.

Clause 6: The method of any of clauses 2-5, wherein determining the AoD comprises:
- receiving, with a location server, the measurement taken by the first mobile device; and
- wherein the AoD is determined by the location server based on the measurement.

Clause 7: The method of any of clauses 1-6, further comprising:
- determining a third time difference, wherein the third time difference comprises a time difference between:
- a time a fourth wireless reference signal transmitted by the network entity arrives at a third mobile device, and
- a time the third mobile device receives a fifth wireless reference signal transmitted by the first mobile device;
- wherein determining the position of the first mobile device is further based on the third time difference.

Clause 8: The method of any of clauses 1-7, further comprising determining a distance between the second mobile device and the network entity, wherein determining the position of the first mobile device is further based on the distance between the second mobile device and the network entity.

Clause 9: The method of any of clauses 1-8, wherein the first wireless reference signal and the third wireless reference signal comprise the same signal.

Clause 10: The method of any of clauses 1-8, wherein the first wireless reference signal and the third wireless reference signal comprise different signals, and determining the position of the first mobile device is further based on a difference in time between the transmission of the first wireless reference signal and the third wireless reference signal.

Clause 11: The method of any of clauses 1-2 or 7-10, wherein determining the position of the first mobile device comprises determining the position of the first mobile device with the first mobile device.

Clause 12: The method of clause 11, wherein providing the position of the first mobile device comprises sending the position of the first mobile device from the first mobile device to the second mobile device.

Clause 13: The method of clause 11 or clause 12, further comprising:
- receiving, with the first mobile device from the second mobile device, information indicative of the second time difference;
- receiving, with the first mobile device from the network entity or a location server, an indication of a position of the second mobile device relative to a position of the network entity; and
- determining, with the first mobile device, a distance between the first mobile device and the network entity based at least in part on the indication of the second time difference;
- wherein determining the position of the first mobile device is further based on the distance between the first mobile device and the network entity.

Clause 14: The method of clause 13, wherein the indication of the position of the second mobile device relative to the position of the network entity comprises:
- a distance between the second mobile device and the network entity, or
- a position of the network entity and a position of the second mobile device.

Clause 15: The any of clauses 1-2 or 7-10, wherein determining the position of the first mobile device comprises determining the position of the first mobile device with a location server.

Clause 16: The method of clause 15, further comprising receiving a request at the location server for the position of the first mobile device from a requesting entity, and wherein providing the position of the first mobile device comprises sending the position of the first mobile device from the location server to the requesting entity.

Clause 17: The method of any of clauses 1-16, wherein:
- the network entity comprises a base station or Transmission Reception Point (TRP); and
- the first wireless reference signal comprises:
- a Positioning Reference Signal (PRS),
- a Synchronization Signal Block (SSB),
- a Tracking Reference Signal (TRS),
- a Channel State Information Reference Signal (CSIRS), or Demodulation Reference Signal (DMRS), or
any combination thereof.

Clause 18: The method of any of clauses 1-16, wherein:
the network entity comprises a third mobile device; and
the first wireless reference signal, the second wireless reference signal, or both comprise:
a sidelink PRS (SL-PRS),
a DMRS, or
a CSIRS, or
any combination thereof.

Clause 19: The method of any of clauses 1-18, wherein:
the first wireless reference signal is on a first wireless frequency band; and
the second wireless reference signal, the third wireless reference signal, or both, are on a second frequency band.

Clause 20: A device comprising:
a communication interface;
a memory; and
one or more processing units communicatively coupled with the communication interface and the memory and configured to:
determine a first time difference, wherein the first time difference comprises a time difference between:
a time a first wireless reference signal transmitted by a network entity arrives at a first mobile device, and
a time the first mobile device transmits a second wireless reference signal;
determine a second time difference, wherein the second time difference comprises a time difference between:
a time a third wireless reference signal transmitted by the network entity arrives at a second mobile device, and
a time the second wireless reference signal arrives at the second mobile device;
determine a position of the first mobile device based on the first time difference and the second time difference; and
provide the position of the first mobile device.

Clause 21: The device of clause 20, wherein the one or more processing units are further configured to determine an Angle of Departure (AoD) of the first wireless reference signal based on a measurement taken by the first mobile device, wherein determining the position of the first mobile device is further based on the AoD.

Clause 22: The device of clause 21, wherein:
the device comprises the second mobile device;
the communication interface comprises a wireless communication interface; and
to determine the AoD, the one or more processing units are configured to:
obtain, via the wireless communication interface, assistance data from a location server; and
receive, via the wireless communication interface, the measurement taken by the first mobile device; and
wherein the one or more processing units are configured to determine the AoD based on the measurement and the assistance data.

Clause 23: The device of clause 22, wherein the assistance data comprises boresight and beam width of the first wireless reference signal.

Clause 24: The device of clause 21 or 22, wherein the one or more processing units are further configured to send, via the wireless communication interface, an indication of the AoD to the network entity or the location server.

Clause 25: The device of any of clauses 21-24, wherein:
the device comprises a location server; and
wherein the one or more processing units configured to determine the AoD comprise one or more processing units configured to:
receive, via the communication interface, the measurement taken by the first mobile device; and
determine the AoD based on the measurement.

Clause 26: The device of any of clauses 20-25, wherein the one or more processing units are further configured to:
determine a third time difference, wherein the third time difference comprises a time difference between:
a time a fourth wireless reference signal transmitted by the network entity arrives at a third mobile device, and
a time the third mobile device receives a fifth wireless reference signal transmitted by the first mobile device;
wherein determining the position of the first mobile device is further based on the third time difference.

Clause 27: The device of any of clauses 20-26, wherein the one or more processing units are further configured to determine a distance between the second mobile device and the network entity, wherein determining the position of the first mobile device is further based on the distance between the second mobile device and the network entity.

Clause 28: The device of any of clauses 20-27, wherein the first wireless reference signal and the third wireless reference signal comprise the same signal.

Clause 29: The device of any of clauses 20-27, wherein the first wireless reference signal and the third wireless reference signal comprise different signals, and wherein the one or more processing units are further configured to determine the position of the first mobile device further based on a difference in time between the transmission of the first wireless reference signal and the third wireless reference signal.

Clause 30: The device of any of clauses 20-21 or 26-29, wherein the device comprises the first mobile device the first mobile device.

Clause 31: The device of clause 30, wherein the one or more processing units configured to provide the position of the first mobile device comprise the one or more processing units configured to send, via the communication interface, the position of the first mobile device to the first mobile device.

Clause 32: The device of clause 30 or clause 31, wherein:
the device comprises the first mobile device;
the communication interface comprises a wireless communication interface; and the one or more processing units are further configured to:
receive, via the wireless communication interface from the second mobile device, information indicative of the second time difference;
receive, via the wireless communication interface from the network entity or a location server, an indication of a position of the second mobile device relative to a position of the network entity; and
determine a distance between the first mobile device and the network entity based at least in part on the indication of the second time difference;
wherein determining the position of the first mobile device is further based on the distance between the first mobile device and the network entity.

Clause 33: The device of clause 32, wherein the indication of the position of the second mobile device relative to the position of the network entity comprises:

a distance between the second mobile device and the network entity, or a position of the network entity and a position of the second mobile device.

Clause 34: The device of clauses 20-21 or 26-29, wherein the device comprises a location server.

Clause 35: The device of clause 34, wherein:

the one or more processing units are further configured to receive, via the communication interface, a request for the position of the first mobile device from a requesting entity; and to provide the position of the first mobile device, the one or more processing units are configured to provide the position of the first mobile device from the location server to the requesting entity.

Clause 36: A device comprising:

means for determining a first time difference, wherein the first time difference comprises a time difference between:

a time a first wireless reference signal transmitted by a network entity arrives at a first mobile device, and a time the first mobile device transmits a second wireless reference signal;

means for determining a second time difference, wherein the second time difference comprises a time difference between:

a time a third wireless reference signal transmitted by the network entity arrives at a second mobile device, and a time the second wireless reference signal arrives at the second mobile device;

means for determining a position of the first mobile device based on the first time difference and the second time difference; and means for providing the position of the first mobile device.

Clause 37: The device of clause 36, further comprising means for determining an Angle of Departure (AoD) of the first wireless reference signal based on a measurement taken by the first mobile device, wherein the means for determining the position of the first mobile device are configured to determine the position of the first mobile device further based on the AoD.

Clause 38: The device of clause 36, further comprising:

means for determining a third time difference, wherein the third time difference comprises a time difference between:

a time a fourth wireless reference signal transmitted by the network entity arrives at a third mobile device, and a time the third mobile device receives a fifth wireless reference signal transmitted by the first mobile device;

wherein the means for determining the position of the first mobile device are configured to determine the position of the first mobile device further based on the third time difference.

Clause 39: The device of clause 36, further comprising means for determining a distance between the second mobile device and the network entity, wherein the means for determining the position of the first mobile device are configured to determine the position of the first mobile device further based on distance.

Clause 40: A non-transitory computer-readable medium storing instructions for determining a position of a first mobile device, the instructions comprising code for:

determining a first time difference, wherein the first time difference comprises a time difference between:

a time a first wireless reference signal transmitted by a network entity arrives at the first mobile device, and a time the first mobile device transmits a second wireless reference signal;

determining a second time difference, wherein the second time difference comprises a time difference between:

a time a third wireless reference signal transmitted by the network entity arrives at a second mobile device, and a time the second wireless reference signal arrives at the second mobile device;

determining the position of the first mobile device based on the first time difference and the second time difference; and providing the position of the first mobile device.

What is claimed is:

1. A method of determining a position of a first mobile device, the method comprising:

determining a first time difference, wherein the first time difference comprises a time difference between:

a time a first wireless reference signal transmitted by a network entity arrives at the first mobile device, and a time the first mobile device transmits a second wireless reference signal;

determining a second time difference, wherein the second time difference comprises a time difference between:

a time a third wireless reference signal transmitted by the network entity arrives at a second mobile device, and a time the second wireless reference signal arrives at the second mobile device;

determining the position of the first mobile device based on the first time difference and the second time difference; and providing the position of the first mobile device.

2. The method of claim 1, further comprising determining an Angle of Departure (AoD) of the first wireless reference signal based on a measurement taken by the first mobile device, wherein determining the position of the first mobile device is further based on the AoD.

3. The method of claim 2, wherein determining the AoD comprises:

obtaining, with the second mobile device, assistance data from a location server; and receiving, with the second mobile device, the measurement taken by the first mobile device; and wherein the AoD is determined by the second mobile device based on the measurement and the assistance data.

4. The method of claim 3, wherein the assistance data comprises boresight and beam width of the first wireless reference signal.

5. The method of claim 3, further comprising sending, with the second mobile device, an indication of the AoD to the network entity or the location server.

6. The method of claim 2, wherein determining the AoD comprises:

receiving, with a location server, the measurement taken by the first mobile device; and wherein the AoD is determined by the location server based on the measurement.

7. The method of claim 1, further comprising:

determining a third time difference, wherein the third time difference comprises a time difference between:

a time a fourth wireless reference signal transmitted by the network entity arrives at a third mobile device, and
a time the third mobile device receives a fifth wireless reference signal transmitted by the first mobile device;
wherein determining the position of the first mobile device is further based on the third time difference.

8. The method of claim 1, further comprising determining a distance between the second mobile device and the network entity, wherein determining the position of the first mobile device is further based on the distance between the second mobile device and the network entity.

9. The method of claim 1, wherein the first wireless reference signal and the third wireless reference signal comprise the same signal.

10. The method of claim 1, wherein the first wireless reference signal and the third wireless reference signal comprise different signals, and determining the position of the first mobile device is further based on a difference in time between transmission of the first wireless reference signal and transmission of the third wireless reference signal.

11. The method of claim 1, wherein determining the position of the first mobile device comprises determining the position of the first mobile device with the first mobile device.

12. The method of claim 11, wherein providing the position of the first mobile device comprises sending the position of the first mobile device from the first mobile device to the second mobile device.

13. The method of claim 11, further comprising:
receiving, with the first mobile device from the second mobile device, information indicative of the second time difference;
receiving, with the first mobile device from the network entity or a location server, an indication of a position of the second mobile device relative to a position of the network entity; and
determining, with the first mobile device, a distance between the first mobile device and the network entity based at least in part on the indication of the second time difference;
wherein determining the position of the first mobile device is further based on the distance between the first mobile device and the network entity.

14. The method of claim 13, wherein the indication of the position of the second mobile device relative to the position of the network entity comprises:
a distance between the second mobile device and the network entity, or
a position of the network entity and a position of the second mobile device.

15. The method of claim 1, wherein determining the position of the first mobile device comprises determining the position of the first mobile device with a location server.

16. The method of claim 15, further comprising receiving a request at the location server for the position of the first mobile device from a requesting entity, and wherein providing the position of the first mobile device comprises sending the position of the first mobile device from the location server to the requesting entity.

17. The method of claim 1, wherein:
the network entity comprises a base station or Transmission Reception Point (TRP); and
the first wireless reference signal comprises:
a Positioning Reference Signal (PRS),
a Synchronization Signal Block (SSB),
a Tracking Reference Signal (TRS),
a Channel State Information Reference Signal (CSIRS), or
Demodulation Reference Signal (DMRS), or
any combination thereof.

18. The method of claim 1, wherein:
the network entity comprises a third mobile device; and
the first wireless reference signal, the second wireless reference signal, or both comprise:
a sidelink PRS (SL-PRS),
a DMRS, or
a CSIRS, or
any combination thereof.

19. The method of claim 1, wherein:
the first wireless reference signal is on a first wireless frequency band; and
the second wireless reference signal, the third wireless reference signal, or both, are on a second frequency band.

20. A device comprising:
a communication interface;
a memory; and
one or more processing units communicatively coupled with the communication interface and the memory and configured to:
determine a first time difference, wherein the first time difference comprises a time difference between:
a time a first wireless reference signal transmitted by a network entity arrives at a first mobile device, and
a time the first mobile device transmits a second wireless reference signal;
determine a second time difference, wherein the second time difference comprises a time difference between:
a time a third wireless reference signal transmitted by the network entity arrives at a second mobile device, and
a time the second wireless reference signal arrives at the second mobile device;
determine a position of the first mobile device based on the first time difference and the second time difference; and
provide the position of the first mobile device.

21. The device of claim 20, wherein the one or more processing units are further configured to determine an Angle of Departure (AoD) of the first wireless reference signal based on a measurement taken by the first mobile device, wherein determining the position of the first mobile device is further based on the AoD.

22. The device of claim 21, wherein:
the device comprises the second mobile device;
the communication interface comprises a wireless communication interface; and
to determine the AoD, the one or more processing units are configured to:
obtain, via the wireless communication interface, assistance data from a location server; and
receive, via the wireless communication interface, the measurement taken by the first mobile device; and
wherein the one or more processing units are configured to determine the AoD based on the measurement and the assistance data.

23. The device of claim 22, wherein the one or more processing units are further configured to send, via the wireless communication interface, an indication of the AoD to the network entity or the location server.

24. The device of claim 21, wherein:
the device comprises a location server; and wherein the one or more processing units configured to determine the AoD comprise one or more processing units configured to:

receive, via the communication interface, the measurement taken by the first mobile device; and determine the AoD based on the measurement.

25. The device of claim 20, wherein the one or more processing units are further configured to:

determine a third time difference, wherein the third time difference comprises a time difference between:

a time a fourth wireless reference signal transmitted by the network entity arrives at a third mobile device, and a time the third mobile device receives a fifth wireless reference signal transmitted by the first mobile device;

wherein determining the position of the first mobile device is further based on the third time difference.

26. The device of claim 20, wherein the one or more processing units are further configured to determine a distance between the second mobile device and the network entity, wherein determining the position of the first mobile device is further based on the distance between the second mobile device and the network entity.

27. The device of claim 20, wherein the first wireless reference signal and the third wireless reference signal comprise different signals, and wherein the one or more processing units are further configured to determine the position of the first mobile device further based on a difference in time between transmission of the first wireless reference signal and transmission of the third wireless reference signal.

28. The device of claim 20, wherein the device comprises the first mobile device.

29. The device of claim 28, wherein the one or more processing units configured to provide the position of the first mobile device comprise one or more processing units configured to send, via the communication interface, the position of the first mobile device to the first mobile device.

30. The device of claim 28, wherein:

the device comprises the first mobile device;

the communication interface comprises a wireless communication interface; and the one or more processing units are further configured to:

receive, via the wireless communication interface from the second mobile device, information indicative of the second time difference;

receive, via the wireless communication interface from the network entity or a location server, an indication of a position of the second mobile device relative to a position of the network entity; and determine a distance between the first mobile device and the network entity based at least in part on the indication of the second time difference;

wherein determining the position of the first mobile device is further based on the distance between the first mobile device and the network entity.

31. The device of claim 30, wherein the indication of the position of the second mobile device relative to the position of the network entity comprises:

a distance between the second mobile device and the network entity, or a position of the network entity and a position of the second mobile device.

32. The device of claim 20, wherein the device comprises a location server.

33. The device of claim 32, wherein:

the one or more processing units are further configured to receive, via the communication interface, a request for the position of the first mobile device from a requesting entity; and to provide the position of the first mobile device, the one or more processing units are configured to provide the position of the first mobile device from the location server to the requesting entity.

34. A device comprising:

means for determining a first time difference, wherein the first time difference comprises a time difference between:

a time a first wireless reference signal transmitted by a network entity arrives at a first mobile device, and a time the first mobile device transmits a second wireless reference signal;

means for determining a second time difference, wherein the second time difference comprises a time difference between:

a time a third wireless reference signal transmitted by the network entity arrives at a second mobile device, and a time the second wireless reference signal arrives at the second mobile device;

means for determining a position of the first mobile device based on the first time difference and the second time difference; and means for providing the position of the first mobile device.

35. A non-transitory computer-readable medium storing instructions for determining a position of a first mobile device, the instructions comprising code for:

determining a first time difference, wherein the first time difference comprises a time difference between:

a time a first wireless reference signal transmitted by a network entity arrives at the first mobile device, and a time the first mobile device transmits a second wireless reference signal;

determining a second time difference, wherein the second time difference comprises a time difference between:

a time a third wireless reference signal transmitted by the network entity arrives at a second mobile device, and a time the second wireless reference signal arrives at the second mobile device;

determining the position of the first mobile device based on the first time difference and the second time difference; and providing the position of the first mobile device.

* * * * *